(12) United States Patent
Kim et al.

(10) Patent No.: US 9,888,429 B2
(45) Date of Patent: Feb. 6, 2018

(54) MULTI-NETWORK BASED SIMULTANEOUS DATA TRANSMISSION METHOD AND APPARATUSES APPLIED TO THE SAME

(75) Inventors: Jeong Su Kim, Seongnam-si (KR); Gyu Min Lee, Yongin-si (KR)

(73) Assignee: SK TELECOM CO., LTD., Seoul (KR)

( * ) Notice: Subject to any disclaimer, the term of this patent is extended or adjusted under 35 U.S.C. 154(b) by 814 days.

(21) Appl. No.: 13/571,965

(22) Filed: Aug. 10, 2012

(65) Prior Publication Data

US 2013/0041981 A1 Feb. 14, 2013

(30) Foreign Application Priority Data

Aug. 12, 2011 (KR) .................. 10-2011-0080540
Aug. 26, 2011 (KR) .................. 10-2011-0085860

(51) Int. Cl.
*G06F 15/16* (2006.01)
*H04W 48/16* (2009.01)
*H04W 48/18* (2009.01)

(52) U.S. Cl.
CPC ............ *H04W 48/16* (2013.01); *H04W 48/18* (2013.01)

(58) Field of Classification Search
USPC ........................................................ 709/217
See application file for complete search history.

(56) References Cited

U.S. PATENT DOCUMENTS

2007/0116012 A1* 5/2007 Chang .................. H04W 48/18 370/395.52
2009/0252059 A1 10/2009 Vigue et al.
2010/0167724 A1* 7/2010 Haran .................. H04W 48/12 455/432.3
2011/0044264 A1* 2/2011 Chen .................. H04W 36/245 370/329
2011/0075605 A1* 3/2011 De Pasquale .......... H04B 7/022 370/328
2011/0093933 A1* 4/2011 Lindholm ............. H04L 63/107 726/5
2011/0201335 A1* 8/2011 Garrett .................. H04W 36/32 455/436
2011/0286437 A1* 11/2011 Austin .................... H04W 4/02 370/338

(Continued)

FOREIGN PATENT DOCUMENTS

| CN | 101345981 A | 1/2009 |
|---|---|---|
| JP | 2005027815 | 2/2005 |
| JP | 2009124505 A | 6/2009 |

(Continued)

OTHER PUBLICATIONS

Korean Notice to File a Response for application No. 10-2011-0080540 dated Aug. 23, 2013.

(Continued)

*Primary Examiner* — Vivek Srivastava
*Assistant Examiner* — Hermon Asres
(74) *Attorney, Agent, or Firm* — Hauptman Ham, LLP

(57) ABSTRACT

A heterogeneous network based simultaneous data transmission service method can effectively control the access of a terminal device to an optimum network interface at a current location to thereby implement an effective and highly reliable heterogeneous network based simultaneous data transmission service.

19 Claims, 12 Drawing Sheets

(56) References Cited

U.S. PATENT DOCUMENTS

2014/0004854 A1* 1/2014 Veran .................... H04W 48/18
455/432.1

FOREIGN PATENT DOCUMENTS

| JP | 2010502144 A | 1/2010 |
|---|---|---|
| KR | 1020050011229 A | 1/2005 |
| KR | 1020070041096 A | 4/2007 |
| KR | 20080095136 | 10/2008 |
| KR | 1020080095136 A | 10/2008 |
| KR | 10874152 | 12/2008 |
| KR | 1020090081639 A | 7/2009 |

OTHER PUBLICATIONS

Korea Notice of Allowance for application No. 10-2011-0080540 dated Feb. 24, 2014.
Korean Office Action for application No. 10-2011-0085860 dated Mar. 29, 2013.
Korean Notice of Allowance for application No. 10-2011-0085860 dated Aug. 22, 2013.

* cited by examiner

MULTI-NETWORK BASED SIMULTANEOUS DATA TRANSMISSION METHOD AND APPARATUSES APPLIED TO THE SAME

CROSS REFERENCE TO RELATED APPLICATION

This application claims the priority of Korean Patent Application No. 10-2011-0080540 filed on Aug. 12, 2011, and Korean Patent Application No. 10-2011-0085860 filed on Aug. 26, 2011 in the KIPO (Korean Intellectual Property Office), the disclosure of which is incorporated herein in their entirety by reference.

BACKGROUND

1. Technical Field

The present disclosure relates to a simultaneous data transmission scheme.

More particularly, the present disclosure relates to simultaneous data transmission service method in multi-networks environments, which provides a transmitting device with a network selection policy including information on at least one network interface selected from a plurality of network which the transmitting device can access, so as for the transmitting device to access the selected network interface. Also, the present disclosure relates to a transmission apparatus and an operation method thereof and a policy management apparatus and an operation method thereof.

2. Description of the Related Art

Recently, it is common that communication service providers provide various services based on various wireless communication technologies. The service providers have provided services based on WLAN (ex. WiFi) related a short range wireless network, as well as the WCDMA, CDMA, and WiBro. Moreover, they positively employ a Long Term Evolution (LTE) technology.

In a heterogeneous networks environment including various networks mixed therein as described above, it is general scheme for providing data service with a terminal device such that the terminal device selects access network for data service among heterogeneous networks. Therefore it can be said that the conventional scheme is not preferable for the service provider because the service provider has limitation on the controllability of the selection of access network.

Meanwhile, these days, various wireless devices, such as a smart phone and a tablet PC, has been developed. In addition, a charge for data service decreased, and simultaneously data service using a large amount of data traffic increased. In such circumstances, the load on the networks of the service providers rapidly increases, thereby requiring excessive expense for network investment and threatening the service stability.

Accordingly, there is a need for a new service scheme for actively selecting an access network in a heterogeneous network environment according to the network state and achieving an efficient data transmission using the selected network.

SUMMARY

An aspect of the present invention seeks to provide a network selection policy including information of a network interface selected from a plurality of network interfaces identified by the transmitting device, so as for the transmitting device to access the selected network interface for simultaneous data transmission service in multi-networks environments.

In accordance with an aspect of the present invention, there is provided a transmission apparatus, comprising: an information acquisition unit configured to acquire a network selection policy including information on at least one accessible network interface among multi-network interfaces with respect to a current location of the transmission apparatus; a data dividing unit configured to divide the transmitted data into two or more partial data; control unit configured to select said partial data according to the network selection policy; and a communication unit configured to access at least one of optimum network interface among at least one accessible network interface based on the network selection policy and transmit the selected partial data.

The information on the at least one accessible network interface may correspond to priority access network interface information obtained based on performance of the at least one accessible network interface.

In accordance with an aspect of the present invention, there is provided a policy management apparatus, comprising: an information generating unit configured to generate information on at least one accessible network interface among multi-network interface with respect to a current location of a transmitting device; and a policy providing unit configured to provide a network selection policy including the information on the at least one accessible network interface to the transmitting device, for the transmitting device being able to access an optimum network interface among the at least one accessible network interface.

The at least one accessible network interface may include pre-registered location-specific network interfaces among the network interfaces which the transmitting device can access without authentication.

The information on the at least one accessible network interface may correspond to priority access network interface information obtained based on performance of the at least one accessible network interface.

The policy providing unit may be configured to provide the transmitting device with a network selection policy for interrupting an access to the particular network interface among the at least one accessible network interfaces, when there is no data traffic between the transmitting device and the particular network interface.

In accordance with an aspect of the present invention, there is provided an operation method of a policy management apparatus, comprising: identifying at least one accessible network interface among multi-network interfaces with respect to a location of a transmitting device; generating information on the at least one accessible network interface; and providing a network selection policy including the information on the at least one accessible network interface to the transmitting device, for the transmitting device being able to access an optimum network interface among the at least one accessible network interface.

The information on the at least one accessible network interface may correspond to priority access network interface information obtained based on performance of the at least one accessible network interface In accordance with an aspect of the present invention, there is provided a transmission apparatus, comprising: an information acquisition unit configured to acquire a network selection policy including information on at least one priority access network interface among multi-network interfaces based on performance of one or more accessible network interfaces; a control unit configured to select partial data, which is divided from data to be transmitted, based on the network selection policy; and a communication unit configured to access one or more of the at least one priority access network interface based on the network selection policy and transmit the selected partial data through the one or more of the at least one priority access network interface.

In accordance with an aspect of the present invention, there is provided a policy management apparatus, comprising: a performance determination unit configured to determine performance of at least one accessible network interfaces which a transmitting device can access; an information generating unit configured to generate information on at least one priority access network interface among multi-network interfaces based on the performance of the at least one accessible network interfaces; and a policy providing unit configured to provide a network selection policy including the information on at least one priority access network interface with the transmitting device, for the transmitting device being able to access one or more of the at least one priority access network interface based on the network selection policy.

The performance determination unit may be configured to acquire at least one of access history information or operation state information of the transmitting device with respect to each of the at least one accessible network interfaces, and determine the performance using at least one of the access history information or the operation state information.

The access history information may comprise at least one of the number of access trials, or the number of an access failure or an access success, and the operation state information may comprise at least one of information whether the at least one accessible network interfaces are malfunctioning, the number of accessed devices, or a quantity of processed traffics.

The information on the at least one priority access network interface may comprise at least one of a priority access list on network interfaces to which the transmitting device is to make a priority access and an access forbidden list on network interfaces to which the transmitting device is not allowed to try to make an access.

In accordance with an aspect of the present invention, there is provided an operation method of a transmitting device, comprising: acquiring a network selection policy including information on at least one priority access network interface among multi-network interfaces based on performance of one or more accessible network interfaces; accessing one or more of the at least one priority access network interface; selecting partial data, which is divided from data to be transmitted, based on the network selection policy; and transmitting the selected partial data through the one or more of the at least one priority access network interface.

In accordance with an aspect of the present invention, there is provided an operation method of a policy management apparatus, comprising: determining performance of at least one accessible network interfaces which a transmitting device can access; generating information on at least one priority access network interface among multi-network interfaces based on the performance of the at least one accessible network interfaces; and providing a network selection policy including the information on at least one priority access network interface with the transmitting device, for the transmitting device being able to access one or more of the at least one priority access network interface based on the network selection policy.

As described above, in accordance with an aspect of the present invention, a network selection policy including information of a network interface selected from a plurality of network interfaces identified by the transmitting device is provided so as for the transmitting device to access the selected network interface for simultaneous data transmission service in multi-networks environments, so that control of the access of the transmitting device to the optimum network interface can be more effective and high reliability and enhancement of data transmission speed can be achieved in simultaneous data transmission service.

BRIEF DESCRIPTION OF THE DRAWINGS

The above and other objects, features and advantages of some embodiments of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings.

Figure 1:
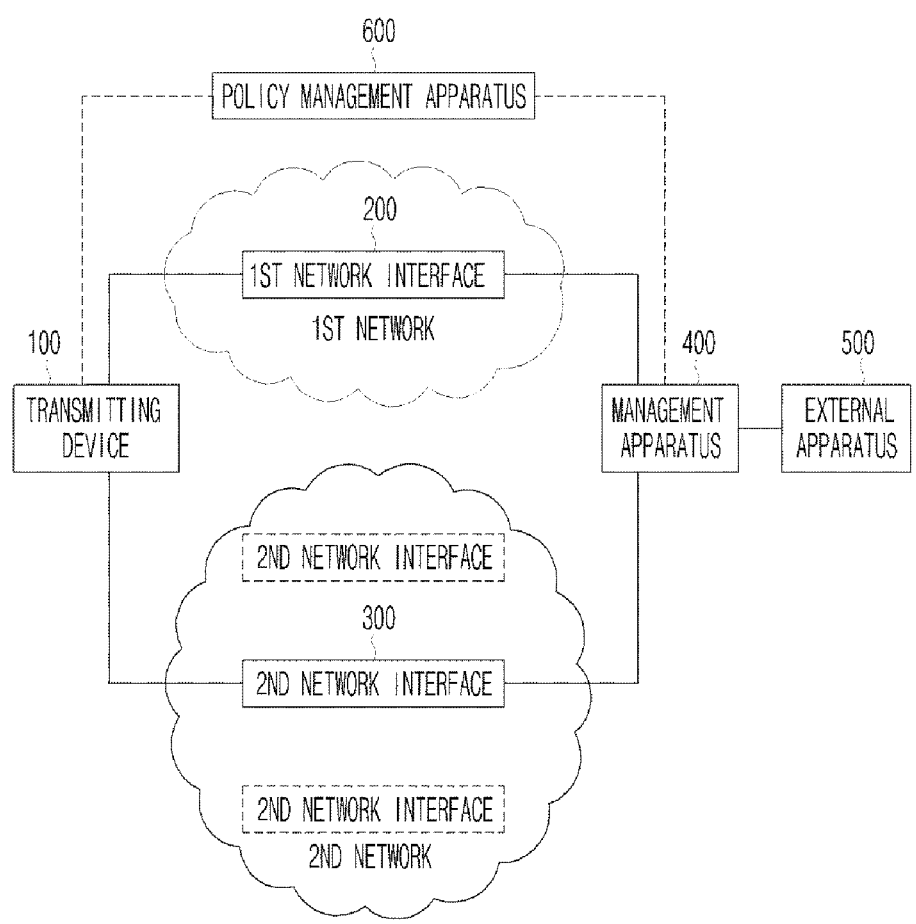
FIG. 1 is a block diagram illustrating a heterogeneous network based simultaneous data transmission service system according to an exemplary embodiment of the present invention.

FIG. 1 is a block diagram illustrating a heterogeneous network based simultaneous data transmission service system according to an exemplary embodiment of the present invention.

Referring to FIG. 1, the heterogeneous network based simultaneous data transmission service system according to the present invention includes: a transmitting device 100 functioning as a transmitting device for dividing data into two or more pieces of partial data, inserting particular virtual network access information in first partial data corresponding to a part of the two or more pieces of partial data and transmitting the first partial data, and inserting the particular virtual network access information in second partial data corresponding to another part of the two or more pieces of partial data and transmitting the second partial data; a first network interface 200 for receiving the first partial data from the transmitting device 100; a second network interface 300 for receiving the second partial data from the transmitting device 100; and a management apparatus 400 for receiving the first partial data from the transmitting device 100 and receiving the second partial data from the transmitting device 100, and generating the data by combining the first partial data and the second partial data according to the particular virtual network access information based on virtual network access information included in the received first partial data and second partial data. Also, the heterogeneous network based simultaneous data transmission service system according to the present invention further includes: an external apparatus 500 for receiving the data generated by combining the first partial data and the second partial data from the management apparatus 400; and a policy management apparatus 600 for providing a network selection policy.

A heterogeneous network based simultaneous data transmission service system according to the present invention implements a construction which divides data for data transmission and reception between the transmitting device 100 and the external apparatus 500 and performs the data transmission and reception by using a plurality of heterogeneous networks.

Therefore, in the present invention, in order to implement a simultaneous link transmission through a plurality of heterogeneous networks for one session, the management apparatus 400 performs the session division. In this event, since the transmitting device 100 is connected to each of the plurality of heterogeneous networks, the management apparatus 400 should recognize respective simultaneous links through a plurality of heterogeneous networks as links of a single transmitting device 100 and manage them with only one subject, i.e. a single transmitting device 100. To this end, it is inevitably required to allocate/manage separate network access information (e.g. virtual IP address) for a simultaneous transmission service corresponding to the transmitting device 100.

The external apparatus 500 refers to a server apparatus which transmits or receives data to or from the transmitting device 100 through the management apparatus 400. The external apparatus 500 can provide various services, such as a portable service and a contents providing service, to the transmitting device 100 through data transmission and reception.

The heterogeneous networks may correspond to various access networks including, for example, a WCDMA network, a CDMA network, a WiBro network, a WLAN (WiFi) network, and a Long Term Evolution (LTE) network. However, for convenience, the description of the present embodiment is limited to a first network (hereinafter, referred to also as "3G network") corresponding to a wireless packet service network (WCDMA) and a second network (hereinafter, referred to also as "WiFi network") corresponding to a near field wireless network (WiFi).

As a result, the first network interface 200 corresponds to a GGSN (Gateway GPRS Support Node) apparatus for operating a 3G network, that is, a wireless packet service network, and the second network interface 300 corresponds to an Access Point (AP) for operating a WiFi network, that is, a near field wireless network.

Further, each of the transmitting device 100 and the management apparatus 400 may function as either a transmitting device or a reception apparatus according to a subject which transmits a service flow or data by using a simultaneous data transmission service, in other words, according to an uplink procedure or a downlink procedure. For convenience of description, the present embodiment is based on an assumption that the transmitting device 100 performs data transmission or reception and the management apparatus 400 provides a simultaneous data transmission service to the transmitting device 100 in a heterogeneous network environment.

The transmitting device 100 acquires a network selection policy with respect to a current location from the policy management apparatus 600.

That is, the transmitting device 100 collects network information, which includes information of a plurality of second network interfaces 300 for operating a WiFi network and cell information of a 3G network, i.e. information of the first network interface 200, in response to an occurrence of an event, for example, at corresponding locations with a pre-established cycle, and transmits a policy request including the collected network information to the policy management apparatus 600 through the 3G network, so as to acquire a network selection policy with respect to a current location from the policy management apparatus 600.

In other words, by transmitting the policy request including the collected network information to the policy management apparatus 600 which manages a list of pre-registered location-specific network interfaces, the transmitting device 100 can receive, through the network selection policy, accessible network interface information (i.e. information of accessible network interfaces), which corresponds to information of the second network interfaces 300 coinciding with the list of pre-registered location-specific network interfaces among the plurality of network interfaces 300 identified based on the collected network information, from the policy management apparatus 600.

In this event, the transmitting device 100 receives the accessible network interface information, which corresponds to a part of a list of already registered second network interfaces 300 or a particular second network interface 300 selected based on state information, such as the number of connected terminal devices and traffic state, of each second network interface 300 corresponding to the current location of the transmitting device 100, from the policy management apparatus 600. Here, a list of accessible network interfaces may include pre-established access priorities of the network interfaces when it is received.

As a result, the transmitting device 100 can access a particular second network interface 300, which is selected from a plurality of second network interfaces 300 which the transmitting device 100 can access at a current location, excluding unregistered network interfaces incapable of guaranteeing the security, based on the accessible network interface information received from the policy management apparatus 600. The unregistered network interfaces refer to network interfaces optionally installed in a WiFi network, which may be set similarly to the second network interface 300 operated by a registered service provider and may acquire only the user information of an accessed terminal device.

Further, the transmitting device 100 selects partial data divided from the data to be transmitted in order to use a simultaneous transmission service.

That is, the transmitting device 100 divides the data to be transmitted into multiple pieces of partial data corresponding to the number of networks for a simultaneous data transmission using a 3G network and a WiFi network, and the transmitting device 100 may perform such a division procedure according to a network selection policy transferred from the policy management apparatus 600.

In other words, the transmitting device 100 identifies a first transmission rate for data transmission to the first network interface 200 and a second transmission rate for data transmission to the second network interface 300 included in the network selection policy, and selects first partial data to be transmitted to the first network interface 200 and second partial data to be transmitted to the second network interface 300 from the divided partial data based on the identified transmission rates.

By performing the above-described data selection procedure based on the network-specific distribution rate changing according to a real time network state or the network selection policy, the transmitting device 100 may apply relative use ratios to the 3G network and the WiFi network, for example, a relative use ratio of 10% to the 3G network and a relative use ratio of 90% to the WiFi network, a relative use ratio of 90% to the 3G network and a relative use ratio of 10% to the WiFi network, or a relative use ratio of 50% to the 3G network and a relative use ratio of 50% to the WiFi network.

Thereafter, based on the network selection policy, the transmitting device 100 accesses a particular second network interface 300 and transmits partial data to the second network interface 300.

That is, based on the accessible network interface information included in the network selection policy, the transmitting device 100 selects a particular second network interface 300 from a plurality of second network interfaces 300 for operating a WiFi network, i.e. a near field network, which the transmitting device 100 can access at a current location, accesses the selected particular second network interface 300, and transmits the second partial data to the selected particular second network interface 300.

Then, the transmitting device 100 transmits the first partial data to the first network interface 200 located in the 3G network, and the first network interface 200 then transmits the first partial data to the management apparatus 400 functioning as a reception apparatus. Further, the transmitting device 100 transmits the second partial data to the particular second network interface 300 selected based on the accessible network interface information, and the second network interface 300 then transmits the second partial data to the management apparatus 400 functioning as a reception apparatus.

The management apparatus 400 receives the first partial data from the first network interface 200 and the second partial data from the second network interface 300, and reconstructs the data to be transmitted by the transmitting device 100 by combining the first partial data and the second partial data with each other based on virtual network access information included in the received first and second partial data.

That is, the management apparatus 400 can reconstruct and generate the original data to be transmitted, by recognizing the first partial data and the second partial data having the same virtual network access information based on the virtual network access information included in the multiple pieces of received partial data, and then combining the first partial data and the second partial data with each other according to the sequence information included in the first partial data and the second partial data.

Further, by using access information of an external apparatus corresponding to the final destination recognized from at least one of the first partial data and the second partial data, the management apparatus 400 transmits the reconstructed data to the external apparatus 500.

As described above, the first partial data and the second partial data divided by the transmitting device 100 are combined together by the management apparatus 400 to be reconstructed into the original data to be transmitted, in the procedure in which the first partial data and the second partial data pass through the management apparatus 400 through the heterogeneous networks, and the reconstructed original data to be transmitted is delivered as a single piece of data to the external apparatus 500 which is the final destination.

The policy management apparatus 600 identifies a plurality of second network interfaces 300 corresponding to the current location of the transmitting device 100 in response to a request from the transmitting device 100.

That is to say, the policy management apparatus 600 receives a policy request including network information collected by the transmitting device 100, which includes information of a plurality of second network interfaces 300 for operating a WiFi network and cell information of a 3G network, i.e. information of the first network interface 200, corresponding to the current location, and identifies the plurality of second network interfaces 300 corresponding to the current location of the transmitting device 100 from the received network information.

Further, the policy management apparatus 600 generates accessible network interface information based on the identified second network interfaces 300.

That is, the policy management apparatus 600 generates accessible network interface information corresponding to information of the other network interfaces except for unregistered network interfaces among the plurality of identified second network interfaces 300 corresponding to the current location of the transmitting device 100.

To this end, the policy management apparatus 600 manages a list of pre-registered location-specific network interfaces 300, and generates the accessible network interface information, which corresponds to information of the second network interfaces 300 coinciding with the list of pre-registered location-specific network interfaces 300 among the plurality of identified second network interfaces 300 corresponding to the current location of the transmitting device 100, based on the list of pre-registered location-specific network interfaces 300.

In this event, the accessible network interface information may include, for example, state information, such as the number of connected terminal devices and traffic state, of each second network interface 300 corresponding to the current location of the transmitting device 100, or a list of one or more second network interfaces 300 corresponding to a part of a list of already registered second network interfaces 300. Here, the list of one or more second network interfaces 300 corresponding to the list of accessible network interfaces may include pre-established access priorities of the network interfaces.

Further, the policy management apparatus 600 induces the transmitting device 100 to access a particular second network interface 300 by providing a network selection policy including the generated accessible network interface information to the transmitting device 100.

That is to say, by providing a network selection policy including the generated accessible network interface information to the transmitting device 100, the policy management apparatus 600 induces the transmitting device 100 to select and access a particular second network interface 300 among a plurality of second network interfaces 300 for operating a WiFi network, i.e. a near field network, which the transmitting device 100 can access at the current location.

Further, based on network state information received from the transmitting device 100 and the management apparatus 400 according to the network state change and various network parameters of heterogeneous networks, including subscriber preference, subscriber type, charging system, and types of service applications to be provided, as well as information a network interface to be subscribed, the policy management apparatus 600 may determine a network selection policy including relative use ratios between heterogeneous networks, and provide the determined network selection policy to the transmitting device 100 and the management apparatus 400, so as to enable the data to be transmitted to be divided into multiple pieces of partial data corresponding to the number of networks for a simultaneous data transmission using a 3G network and a WiFi network.

Then, after providing the network selection policy, the policy management apparatus 600 monitors traffic state of the particular second network interface 300.

That is, after inducing the transmitting device 100 to access the particular second network interface 300 by providing the network selection policy, the policy management apparatus 600 monitors traffic state of the particular second network interface 300. When a traffic corresponding to the transmitting device 100 induced to access the particular second network interface 300 is not detected, the policy management apparatus 600 may provide the transmitting device 100 with a network selection policy for interrupting the access to the second network interface 300, so as to enable the transmitting device 100 to block a traffic to the second network interface 300 which is suspected as an unregistered network interface.

Figure 2:
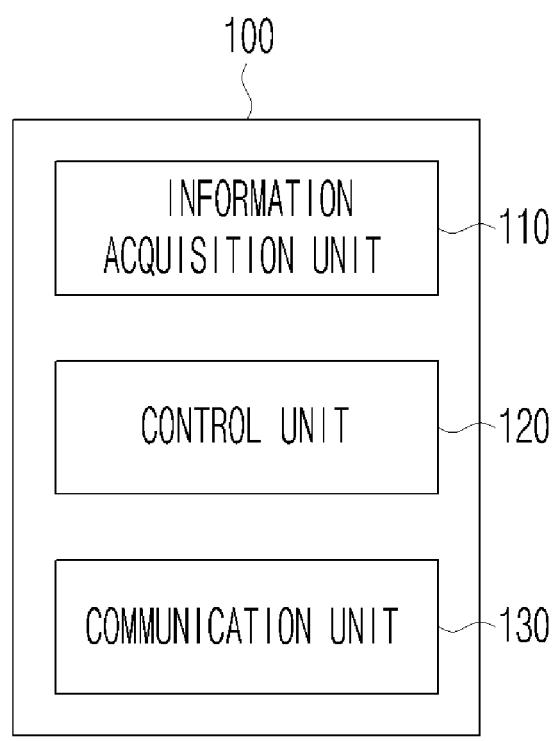
FIG. 2 is a block diagram illustrating a transmitting device according to an exemplary embodiment of the present invention.

Hereinafter, the transmitting device 100 according to an embodiment of the present invention will be described in more detail with reference to FIG. 2.

That is, the transmitting device 100 includes: an information acquisition unit 110 for acquiring a network selection policy corresponding to the current location; a control unit 120 for selecting partial data divided from data to be transmitted; and a communication unit 130 for accessing the second network interface 300 and transmitting the partial data to the second network interface 300. Each of the information acquisition unit 110 and the control unit 120 has a configuration installed in an Operating System (OS) kernel installed in the transmitting device 100, and performs a series of operations for a simultaneous data transmission service according to a request from a particular application embedded or installed in the transmitting device 100. Further, the communication unit 130 may refer to a communication module for interworking with the first network interface 200 through a 3G network and interworking with the second network interface 300 through a WiFi network.

The information acquisition unit 110 acquires a network selection policy corresponding to the current location from the policy management apparatus 600.

That is, the information acquisition unit 110 collects network information, which includes information of a plurality of second network interfaces 300 for operating a WiFi network and cell information of a 3G network, i.e. information of the first network interface 200, in response to an occurrence of an event, for example, at corresponding locations with a pre-established cycle, and transmits a policy request including the collected network information to the policy management apparatus 600 through the 3G network, so as to acquire a network selection policy with respect to a current location from the policy management apparatus 600.

In other words, by transmitting the policy request including the collected network information to the policy management apparatus 600 which manages a list of pre-registered location-specific network interfaces, the information acquisition unit 110 can receive, through the network selection policy, accessible network interface information (i.e. information of accessible network interfaces), which corresponds to information of the second network interfaces 300 coinciding with the list of pre-registered location-specific network interfaces among the plurality of network interfaces 300 identified based on the collected network information, from the policy management apparatus 600.

In this event, the information acquisition unit 110 receives the accessible network interface information, which corresponds to a part of a list of already registered second network interfaces 300 or a particular second network interface 300 selected based on state information, such as the number of connected terminal devices and traffic state, of each second network interface 300 corresponding to the current location of the transmitting device 100, from the policy management apparatus 600. Here, a list of accessible network interfaces may include pre-established access priorities of the network interfaces when it is received.

As a result, the transmitting device 100 can access a particular second network interface 300, which is selected from a plurality of second network interfaces 300 which the information acquisition unit 110 can access at a current location, excluding unregistered network interfaces incapable of guaranteeing the security, based on the accessible network interface information received from the policy management apparatus 600. The unregistered network interfaces refer to network interfaces optionally installed in a WiFi network, which may be set similarly to the second network interface 300 operated by a registered service provider and may acquire only the user information of an accessed terminal device.

Further, the control unit 120 selects partial data divided from the data to be transmitted in order to use a simultaneous transmission service.

That is, the control unit 120 divides the data to be transmitted into multiple pieces of partial data corresponding to the number of networks for a simultaneous data transmission using a 3G network and a WiFi network, and the control unit 120 may perform such a division procedure according to a network selection policy transferred from the policy management apparatus 600.

The control unit 120 may include a data dividing part configured to divide the transmitted data into two or more partial data and a control unit part configured to select said partial data according to the network selection policy.

In detail, the control unit 120 identifies a first transmission rate for data transmission to the first network interface 200 and a second transmission rate for data transmission to the second network interface 300 included in the network selection policy, and selects first partial data to be transmitted to the first network interface 200 and second partial data to be transmitted to the second network interface 300 from the divided partial data based on the identified transmission rates.

By performing the above-described data selection procedure based on the network-specific distribution rate changing according to a real time network state or the network selection policy, the control unit 120 may apply relative use ratios to the 3G network and the WiFi network, for example, a relative use ratio of 10% to the 3G network and a relative use ratio of 90% to the WiFi network, a relative use ratio of 90% to the 3G network and a relative use ratio of 10% to the WiFi network, or a relative use ratio of 50% to the 3G network and a relative use ratio of 50% to the WiFi network.

Then, based on the network selection policy, the communication unit 130 accesses a particular second network interface 300 and transmits partial data to the second network interface 300.

That is, based on the accessible network interface information included in the network selection policy, the communication unit 130 selects a particular second network interface 300 from a plurality of second network interfaces 300 for operating a WiFi network, i.e. a near field network, which the transmitting device 100 can access at a current location, accesses the selected particular second network interface 300, and transmits the second partial data to the selected particular second network interface 300.

Then, the communication unit 130 transmits the first partial data to the first network interface 200 located in the 3G network, and the first network interface 200 then transmits the first partial data to the management apparatus 400 functioning as a reception apparatus. Further, the transmitting device 100 transmits the second partial data to the particular second network interface 300 selected based on the accessible network interface information, and the second network interface 300 then transmits the second partial data to the management apparatus 400 functioning as a reception apparatus.

Figure 3:
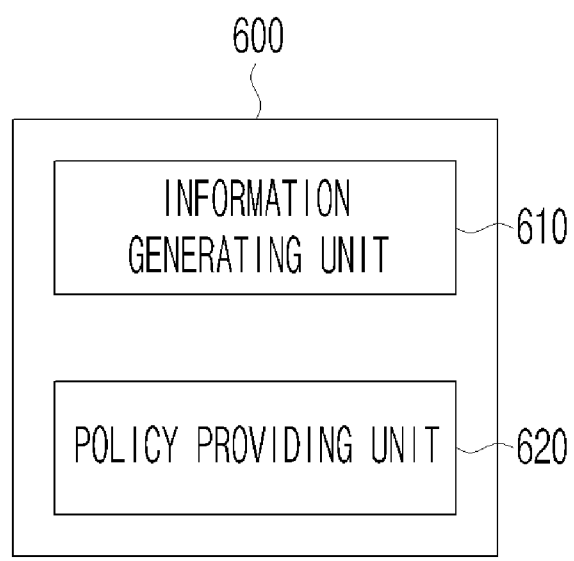
FIG. 3 is a block diagram illustrating a policy management apparatus according to an exemplary embodiment of the present invention.

Hereinafter, a construction of the policy management apparatus 600 according to an embodiment of the present invention will be described in more detail with reference to FIG. 3.

The policy management apparatus 600 includes: an information generating unit 610 for generating accessible network interface information; and a policy providing unit 620 for providing a network selection policy including the generated accessible network interface information to the transmitting device 100.

The information generating unit 610 identifies a plurality of second network interfaces 300 corresponding to the current location of the transmitting device 100 in response to a request from the transmitting device 100.

That is to say, the information generating unit 610 receives a policy request including network information collected by the transmitting device 100, which includes information of a plurality of second network interfaces 300 for operating a WiFi network and cell information of a 3G network, i.e. information of the first network interface 200, corresponding to the current location, and identifies the plurality of second network interfaces 300 corresponding to the current location of the transmitting device 100 from the received network information.

Further, the information generating unit 610 generates accessible network interface information based on the identified second network interfaces 300.

That is, the information generating unit 610 generates accessible network interface information corresponding to information of the other network interfaces except for unregistered network interfaces among the plurality of identified second network interfaces 300 corresponding to the current location of the transmitting device 100.

To this end, the information generating unit 610 manages a list of pre-registered location-specific network interfaces 300, and generates the accessible network interface information, which corresponds to information of the second network interfaces 300 coinciding with the list of pre-registered location-specific network interfaces 300 among the plurality of identified second network interfaces 300 corresponding to the current location of the transmitting device 100, based on the list of pre-registered location-specific network interfaces 300.

In this event, the accessible network interface information may include, for example, state information, such as the number of connected terminal devices and traffic state, of each second network interface 300 corresponding to the current location of the transmitting device 100, or a list of one or more second network interfaces 300 corresponding to a part of a list of already registered second network interfaces 300. Here, the list of one or more second network interfaces 300 corresponding to the list of accessible network interfaces may include pre-established access priorities of the network interfaces.

The policy providing unit 620 induces the transmitting device 100 to access a particular second network interface 300 by providing a network selection policy including the generated accessible network interface information to the transmitting device 100.

That is to say, by providing a network selection policy including the generated accessible network interface information to the transmitting device 100, the policy providing unit 620 induces the transmitting device 100 to select and access a particular second network interface 300 among a plurality of second network interfaces 300 for operating a WiFi network, i.e. a near field network, which the transmitting device 100 can access at the current location.

Further, based on network state information received from the transmitting device 100 and the management apparatus 400 according to the network state change and various network parameters of heterogeneous networks, including subscriber preference, subscriber type, charging system, and types of service applications to be provided, as well as information a network interface to be subscribed, the policy providing unit 620 may determine a network selection policy including relative use ratios between heterogeneous networks, and provide the determined network selection policy to the transmitting device 100 and the management apparatus 400, so as to enable the data to be transmitted to be divided into multiple pieces of partial data corresponding to the number of networks for a simultaneous data transmission using a 3G network and a WiFi network.

Then, after providing the network selection policy, the policy providing unit 620 monitors traffic state of the particular second network interface 300.

That is, after inducing the transmitting device 100 to access the particular second network interface 300 by providing the network selection policy, the policy providing unit 620 monitors traffic state of the particular second network interface 300. When a traffic corresponding to the transmitting device 100 induced to access the particular second network interface 300 is not detected, the policy providing unit 620 may provide the transmitting device 100 with a network selection policy for interrupting the access to the second network interface 300, so as to enable the transmitting device 100 to block a traffic to the second network interface 300 which is suspected as an unregistered network interface.

As described above, in dividing data to be transmitted and simultaneously transmitting the divided data according to a network selection policy in a multi-network environment by a heterogeneous network based simultaneous data transmission service system according to the present invention, the heterogeneous network based simultaneous data transmission service system provides a transmitting device with a network selection policy, which excludes unregistered network interfaces and includes information of accessible network interfaces selected from a plurality of network interfaces identified by network information collected by the transmitting device, and then induces the transmitting device to access an optimum network interface among the selected accessible network interfaces, so as to effectively control an access of the transmitting device to the optimum network interface to thereby implement an effective and highly reliable heterogeneous network based simultaneous data transmission service, and to increase the data transmission speed through the data division transmission.

Figure 4:
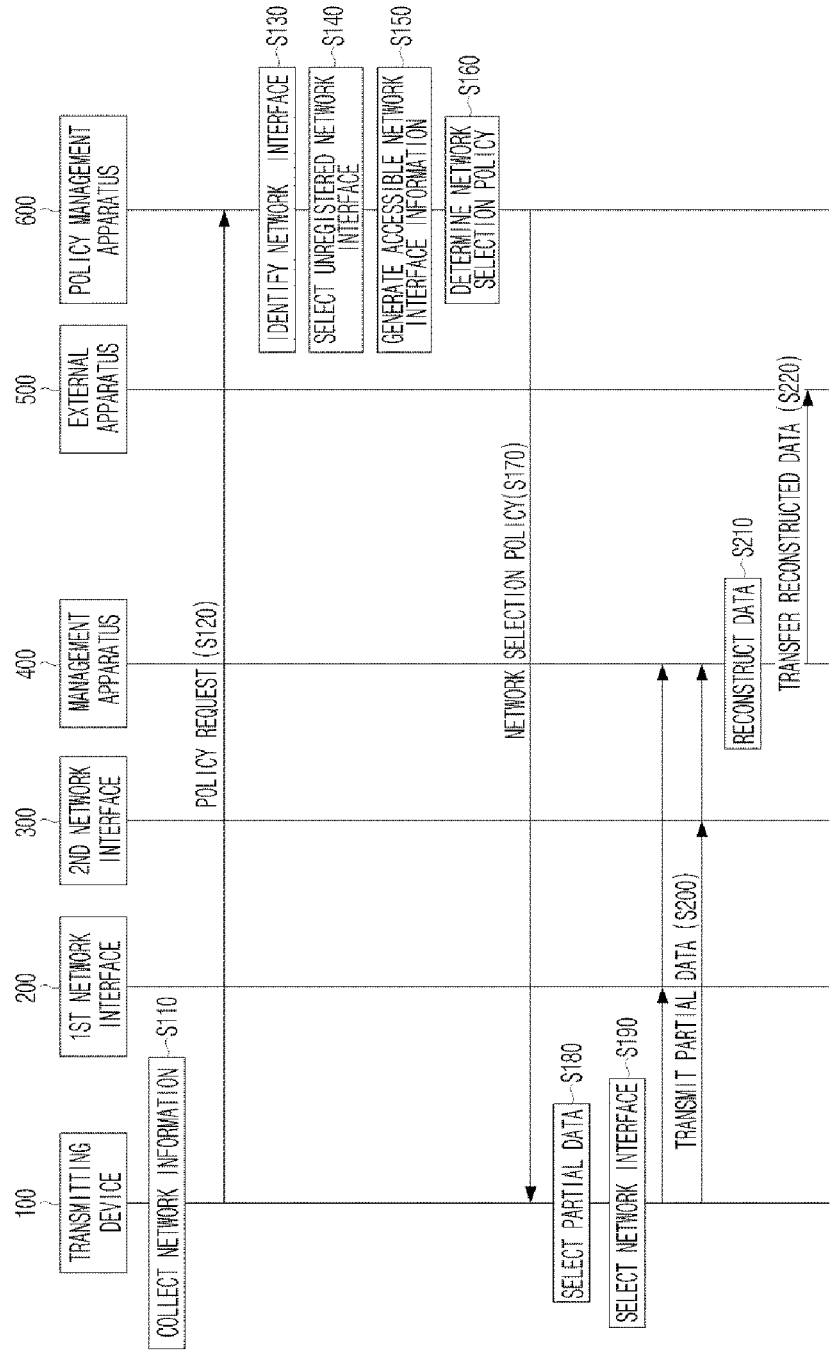
FIG. 4 is a signal flow diagram illustrating a heterogeneous network based simultaneous data transmission service method according to an exemplary embodiment of the present invention.
Figure 5:
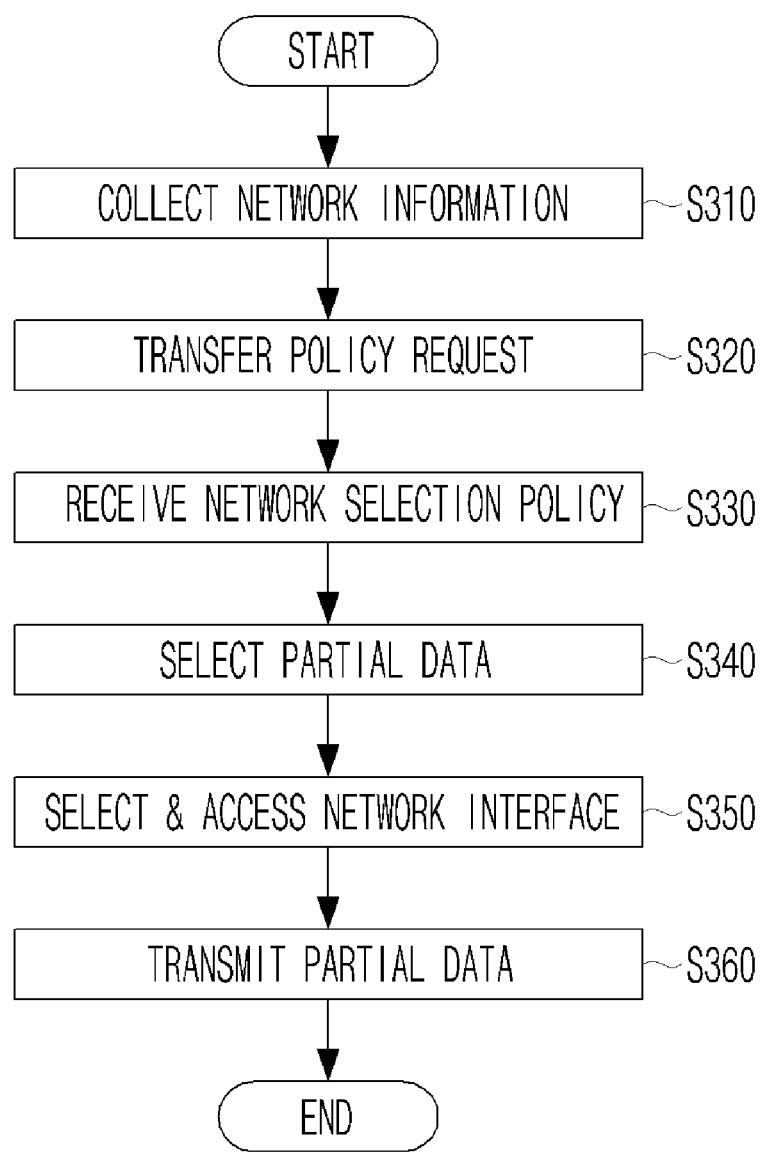
FIG. 5 is a flowchart illustrating an operation of a transmitting device according to an exemplary embodiment of the present invention.
Figure 6:
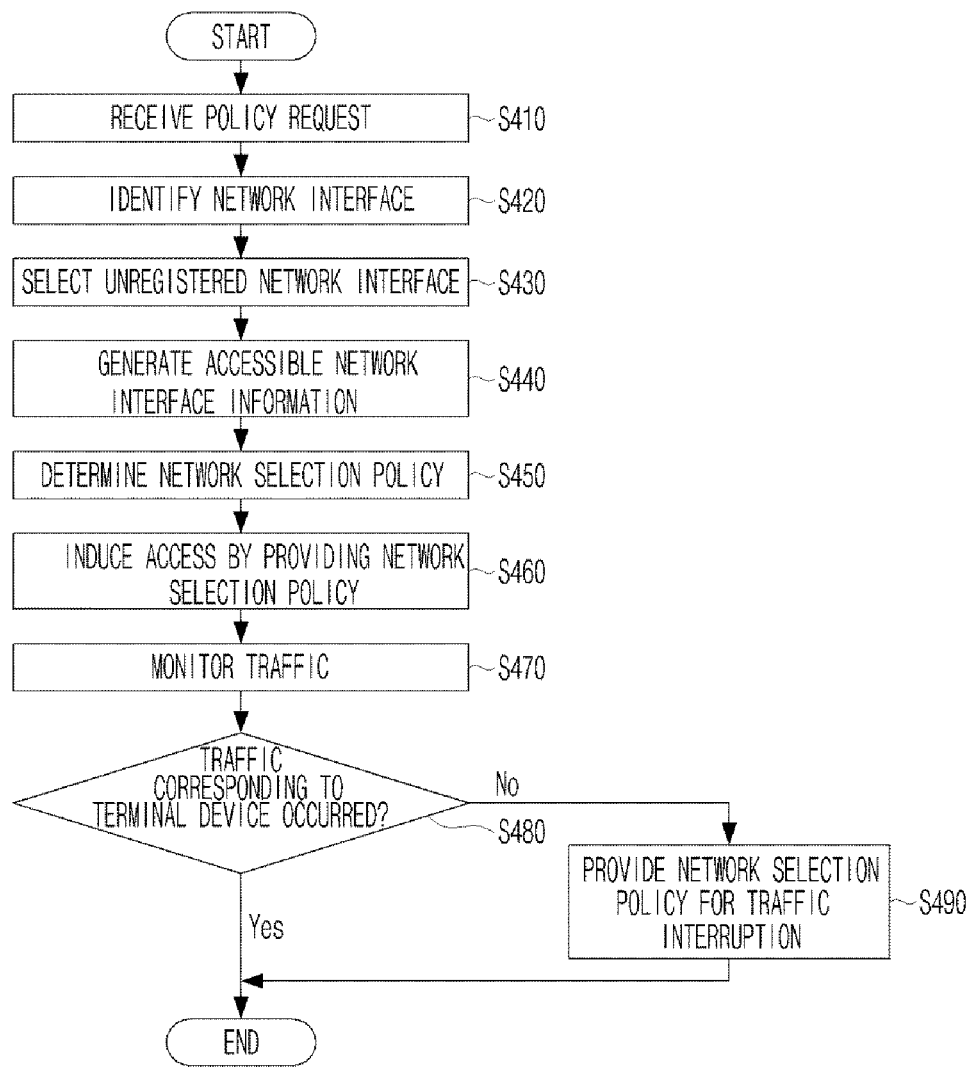
FIG. 6 is a flowchart illustrating an operation of a policy management apparatus according to an exemplary embodiment of the present invention.

Hereinafter, a heterogeneous network based simultaneous data transmission service method according to an embodiment of the present invention will be described with reference to FIGS. 4 to 6. In the following description, the same reference numerals will be used for the elements shown in FIGS. 1 to 3 for convenience of description.

Now, an operation method of a heterogeneous network based simultaneous data transmission service system according to an embodiment of the present invention will be described with reference to FIG. 4.

First, the transmitting device 100 sends a request for a network selection policy with respect to a current location (steps S110 and S120).

In more detail, the transmitting device 100 may collect network information, which includes information of a plurality of second network interfaces 300 for operating a WiFi network and cell information of a 3G network, i.e. information of the first network interface 200, in response to an occurrence of an event, for example, at corresponding locations with a pre-established cycle, and then transmit a policy request including the collected network information to the policy management apparatus 600 through the 3G network, so as to make a request for a network selection policy with respect to a current location from the policy management apparatus 600.

Thereafter, the policy management apparatus 600 identifies a plurality of second network interfaces 300 corresponding to the current location of the transmitting device 100 in response to the request for the network selection policy from the transmitting device 100 (step S130).

That is to say, the policy management apparatus 600 receives a policy request including network information collected by the transmitting device 100, which includes information of a plurality of second network interfaces 300 for operating a WiFi network and cell information of a 3G network, i.e. information of the first network interface 200, corresponding to the current location, and identifies the plurality of second network interfaces 300 corresponding to the current location of the transmitting device 100 from the received network information.

Then, the policy management apparatus 600 generates accessible network interface information based on the identified second network interfaces 300 (steps S140 and S150).

That is, the policy management apparatus 600 generates accessible network interface information corresponding to information of the other network interfaces except for unregistered network interfaces among the plurality of identified second network interfaces 300 corresponding to the current location of the transmitting device 100.

To this end, the policy management apparatus 600 manages a list of pre-registered location-specific network interfaces 300, and generates the accessible network interface information, which corresponds to information of the second network interfaces 300 coinciding with the list of pre-registered location-specific network interfaces 300 among the plurality of identified second network interfaces 300 corresponding to the current location of the transmitting device 100, based on the list of pre-registered location-specific network interfaces 300.

In this event, the accessible network interface information may include, for example, state information, such as the number of connected terminal devices and traffic state, of each second network interface 300 corresponding to the current location of the transmitting device 100, or a list of one or more second network interfaces 300 corresponding to a part of a list of already registered second network interfaces 300. Here, the list of one or more second network interfaces 300 corresponding to the list of accessible network interfaces may include pre-established access priorities of the network interfaces.

Next, the policy management apparatus 600 induces the transmitting device 100 to access a particular second network interface 300 by providing a network selection policy including the generated accessible network interface information to the transmitting device 100 (steps S160 and S170).

In other words, by providing a network selection policy including the generated accessible network interface information to the transmitting device 100, the policy management apparatus 600 induces the transmitting device 100 to select and access a particular second network interface 300 among a plurality of second network interfaces 300 for operating a WiFi network, i.e. a near field network, which the transmitting device 100 can access at the current location.

Further, the transmitting device 100 selects partial data divided from the data to be transmitted in order to use a simultaneous transmission service (step S180).

That is, the transmitting device 100 divides the data to be transmitted into multiple pieces of partial data corresponding to the number of networks for a simultaneous data transmission using a 3G network and a WiFi network, and the transmitting device 100 may perform such a division procedure according to a network selection policy transferred from the policy management apparatus 600.

In other words, the transmitting device 100 identifies a first transmission rate for data transmission to the first network interface 200 and a second transmission rate for data transmission to the second network interface 300 included in the network selection policy, and selects first partial data to be transmitted to the first network interface 200 and second partial data to be transmitted to the second network interface 300 from the divided partial data based on the identified transmission rates.

By performing the above-described data selection procedure based on the network-specific distribution rate changing according to a real time network state or the network selection policy, the transmitting device 100 may apply relative use ratios to the 3G network and the WiFi network, for example, a relative use ratio of 10% to the 3G network and a relative use ratio of 90% to the WiFi network, a relative use ratio of 90% to the 3G network and a relative use ratio of 10% to the WiFi network, or a relative use ratio of 50% to the 3G network and a relative use ratio of 50% to the WiFi network.

Then, based on the network selection policy, the transmitting device 100 accesses a particular second network interface 300 and transmits partial data to the second network interface 300 (steps S190 and S200).

That is, based on the accessible network interface information included in the network selection policy, the transmitting device 100 selects a particular second network interface 300 from a plurality of second network interfaces 300 for operating a WiFi network, i.e. a near field network, which the transmitting device 100 can access at a current location, accesses the selected particular second network interface 300, and transmits the second partial data to the selected particular second network interface 300.

Then, the transmitting device 100 transmits the first partial data to the first network interface 200 located in the 3G network, and the first network interface 200 then transmits the first partial data to the management apparatus 400 functioning as a reception apparatus. Further, the transmitting device 100 transmits the second partial data to the particular second network interface 300 selected based on the accessible network interface information, and the second network interface 300 then transmits the second partial data to the management apparatus 400 functioning as a reception apparatus.

Then, the management apparatus 400 receives the first partial data from the first network interface 200 and the second partial data from the second network interface 300, and reconstructs the data to be transmitted by the transmitting device 100 by combining the first partial data and the second partial data with each other based on virtual network access information included in the received first and second partial data (steps S210 and S220).

That is, the management apparatus 400 can reconstruct and generate the original data to be transmitted, by recognizing the first partial data and the second partial data having the same virtual network access information based on the virtual network access information included in the multiple pieces of received partial data, and then combining the first partial data and the second partial data with each other according to the sequence information included in the first partial data and the second partial data.

Further, by using access information of an external apparatus corresponding to the final destination recognized from at least one of the first partial data and the second partial data, the management apparatus 400 transmits the reconstructed data to the external apparatus 500.

As described above, the first partial data and the second partial data divided by the transmitting device 100 are combined together by the management apparatus 400 to be reconstructed into the original data to be transmitted, in the procedure in which the first partial data and the second partial data pass through the management apparatus 400 through the heterogeneous networks, and the reconstructed original data to be transmitted is delivered as a single piece of data to the external apparatus 500 which is the final destination.

Hereinafter, an operation method of the transmitting device 100 according to an embodiment of the present invention will be described with reference to FIG. 5.

The information acquisition unit 110 acquires a network selection policy corresponding to the current location from the policy management apparatus 600 (steps S310 to S330).

Specifically, the information acquisition unit 110 collects network information, which includes information of a plurality of second network interfaces 300 for operating a WiFi network and cell information of a 3G network, i.e. information of the first network interface 200, in response to an occurrence of an event, for example, at corresponding locations with a pre-established cycle, and transmits a policy request including the collected network information to the policy management apparatus 600 through the 3G network, so as to acquire a network selection policy with respect to a current location from the policy management apparatus 600.

In other words, by transmitting the policy request including the collected network information to the policy management apparatus 600 which manages a list of pre-registered location-specific network interfaces, the information acquisition unit 110 can receive, through the network selection policy, accessible network interface information (i.e. information of accessible network interfaces), which corresponds to information of the second network interfaces 300 coinciding with the list of pre-registered location-specific network interfaces among the plurality of network interfaces 300 identified based on the collected network information, from the policy management apparatus 600.

In this event, the information acquisition unit 110 receives the accessible network interface information, which corresponds to a part of a list of already registered second network interfaces 300 or a particular second network interface 300 selected based on state information, such as the number of connected terminal devices and traffic state, of each second network interface 300 corresponding to the current location of the transmitting device 100, from the policy management apparatus 600. Here, a list of accessible network interfaces may include pre-established access priorities of the network interfaces when it is received.

As a result, the transmitting device 100 can access a particular second network interface 300, which is selected from a plurality of second network interfaces 300 which the information acquisition unit 110 can access at a current location, excluding unregistered network interfaces incapable of guaranteeing the security, based on the accessible network interface information received from the policy management apparatus 600. The unregistered network interfaces refer to network interfaces optionally installed in a WiFi network, which may be set similarly to the second network interface 300 operated by a registered service provider and may acquire only the user information of an accessed terminal device.

Then, the transmitting device 100 selects partial data divided from the data to be transmitted in order to use a simultaneous transmission service.

Specifically, the control unit 120 divides the data to be transmitted into multiple pieces of partial data corresponding to the number of networks for a simultaneous data transmission using a 3G network and a WiFi network, and the control unit 120 may perform such a division procedure according to a network selection policy transferred from the policy management apparatus 600.

In other words, the control unit 120 identifies a first transmission rate for data transmission to the first network interface 200 and a second transmission rate for data transmission to the second network interface 300 included in the network selection policy, and selects first partial data to be transmitted to the first network interface 200 and second partial data to be transmitted to the second network interface 300 from the divided partial data based on the identified transmission rates.

By performing the above-described data selection procedure based on the network-specific distribution rate changing according to a real time network state or the network selection policy, the control unit 120 may apply relative use ratios to the 3G network and the WiFi network, for example, a relative use ratio of 10% to the 3G network and a relative use ratio of 90% to the WiFi network, a relative use ratio of 90% to the 3G network and a relative use ratio of 10% to the WiFi network, or a relative use ratio of 50% to the 3G network and a relative use ratio of 50% to the WiFi network.

Then, based on the network selection policy, the transmitting device 100 accesses a particular second network interface 300 and transmits partial data to the second network interface 300 (steps S350 and S360).

Specifically, based on the accessible network interface information included in the network selection policy, the communication unit 130 may select a particular second network interface 300 from a plurality of second network interfaces 300 for operating a WiFi network, i.e. a near field network, which the transmitting device 100 can access at a current location, access the selected particular second network interface 300, and transmit the second partial data to the selected particular second network interface 300.

As a result, the communication unit 130 may transmit the first partial data to the first network interface 200 located in the 3G network, and the first network interface 200 may then transmit the first partial data to the management apparatus 400 functioning as a reception apparatus. Further, the transmitting device 100 may transmit the second partial data to the particular second network interface 300 selected based on the accessible network interface information, and the second network interface 300 may then transmit the second partial data to the management apparatus 400 functioning as a reception apparatus.

Hereinafter, an operation method of the policy management apparatus 600 according to an embodiment of the present invention will be described with reference to FIG. 6.

First, in response to a request for a network selection policy from the transmitting device 100, the policy management apparatus 600 identifies a plurality of second network interfaces 300 corresponding to the current location of the transmitting device 100 (steps S410 and S420).

Specifically, the information generating unit 610 receives a policy request including network information collected by the transmitting device 100, which includes information of a plurality of second network interfaces 300 for operating a WiFi network and cell information of a 3G network, i.e. information of the first network interface 200, corresponding to the current location, and identifies the plurality of second network interfaces 300 corresponding to the current location of the transmitting device 100 from the received network information.

Thereafter, the information generating unit 610 generates accessible network interface information based on the identified second network interfaces 300 (steps S430 and S440).

Specifically, the information generating unit 610 generates accessible network interface information corresponding to information of the other network interfaces except for unregistered network interfaces among the plurality of identified second network interfaces 300 corresponding to the current location of the transmitting device 100.

To this end, the information generating unit 610 manages a list of pre-registered location-specific network interfaces 300, and generates the accessible network interface information, which corresponds to information of the second network interfaces 300 coinciding with the list of pre-registered location-specific network interfaces 300 among the plurality of identified second network interfaces 300 corresponding to the current location of the transmitting device 100, based on the list of pre-registered location-specific network interfaces 300.

In this event, the accessible network interface information may include, for example, state information, such as the number of connected terminal devices and traffic state, of each second network interface 300 corresponding to the current location of the transmitting device 100, or a list of one or more second network interfaces 300 corresponding to a part of a list of already registered second network interfaces 300. Here, the list of one or more second network interfaces 300 corresponding to the list of accessible network interfaces may include pre-established access priorities of the network interfaces.

Thereafter, the policy management apparatus 600 induces the transmitting device 100 to access a particular second network interface 300 by providing a network selection policy including the generated accessible network interface information to the transmitting device 100 (steps S450 and S460).

Specifically, by providing a network selection policy including the generated accessible network interface information to the transmitting device 100, the policy providing unit 620 induces the transmitting device 100 to select and access a particular second network interface 300 among a plurality of second network interfaces 300 for operating a WiFi network, i.e. a near field network, which the transmitting device 100 can access at the current location.

Meanwhile, after providing the network selection policy, the policy providing unit 620 monitors traffic state of the particular second network interface 300 (steps S470 to S490).

Specifically, after inducing the transmitting device 100 to access the particular second network interface 300 by providing the network selection policy, the policy providing unit 620 monitors traffic state of the particular second network interface 300. When a traffic corresponding to the transmitting device 100 induced to access the particular second network interface 300 is not detected, the policy providing unit 620 may provide the transmitting device 100 with a network selection policy for interrupting the access to the second network interface 300, so as to enable the transmitting device 100 to block a traffic to the second network interface 300 which is suspected as an unregistered network interface.

As described above, in dividing data to be transmitted and simultaneously transmitting the divided data according to a network selection policy in a multi-network environment by a heterogeneous network based simultaneous data transmission service system according to the present invention, the heterogeneous network based simultaneous data transmission service system provides a transmitting device 100 with a network selection policy, which excludes unregistered network interfaces and includes information of accessible network interfaces selected from a plurality of network interfaces identified by network information collected by the transmitting device 100, and then induces the transmitting device 100 to access an optimum network interface among the selected accessible network interfaces, so as to effectively control an access of the transmitting device 100 to the optimum network interface to thereby implement an effective and highly reliable heterogeneous network based simultaneous data transmission service, and to increase the data transmission speed through the data division transmission.

Figure 7:
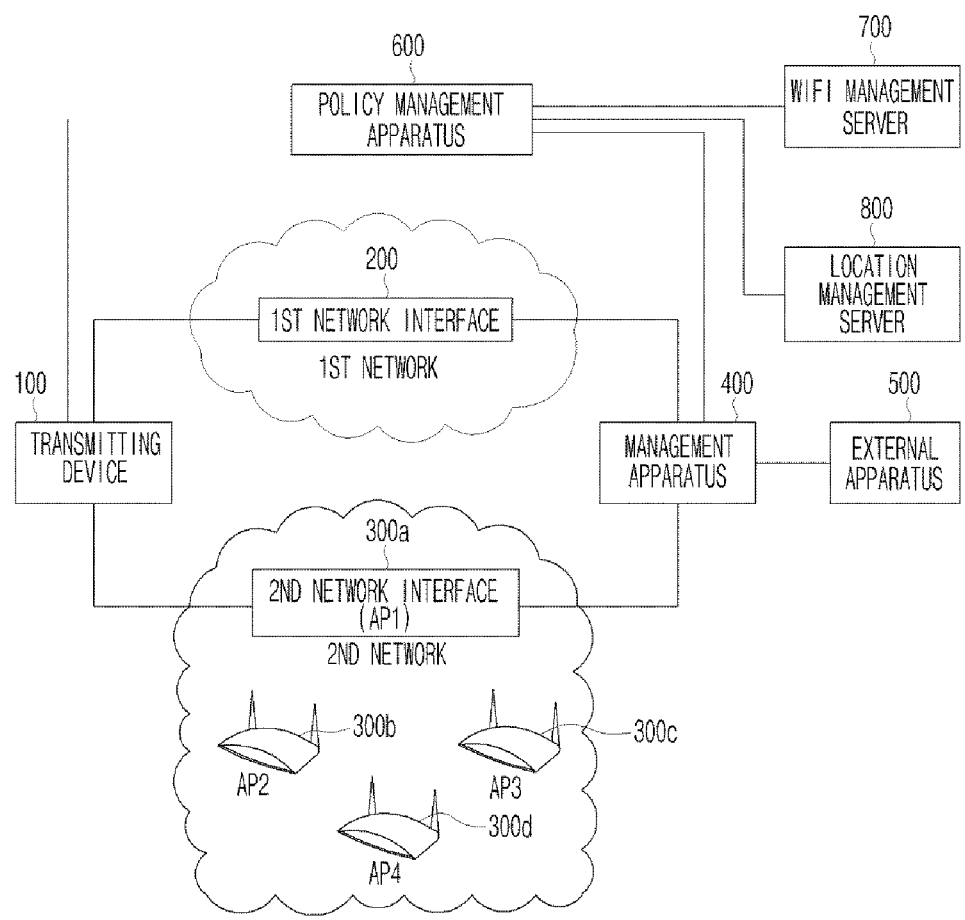
FIG. 7 is a block diagram illustrating a heterogeneous network based simultaneous data transmission service system according to an exemplary embodiment of the present invention.

FIG. 7 is a block diagram illustrating a heterogeneous network based simultaneous data transmission service system according to another exemplary embodiment of the present invention.

Referring to FIG. 7, the heterogeneous network based simultaneous data transmission service system according to the present invention includes: a management apparatus 400 supporting a simultaneous transmission service for dividing data to be transmitted into two or more pieces of partial data and then transmitting the divided partial data through two or more networks; and at least one transmitting device 100 for accessing the management apparatus 400 and using the simultaneous transmission service.

The two or more networks, i.e. heterogeneous networks, may include a WCDMA network, a CDMA network, a WiBro network, a WLAN (WiFi) network, and a Long Term Evolution (LTE) network.

Further, for convenience, the description of the present embodiment is limited to a first network (hereinafter, referred to also as "3G network") corresponding to a wireless packet service network (WCDMA) and a second network (hereinafter, referred to also as "WiFi network") corresponding to a near field wireless network (WiFi). As a result, the first network interface 200 corresponds to a GGSN (Gateway GPRS Support Node) apparatus for operating a 3G network, that is, a wireless packet service network, and the second network interface 300 corresponds to an Access Point (AP) for operating a WiFi network, that is, a near field wireless network.

In addition, the heterogeneous network based simultaneous data transmission service system according to the present invention further includes: an external apparatus 500 for receiving the data combined/reconstructed according to the simultaneous transmission service from the management apparatus 400; and a policy management apparatus 600 for providing a network selection policy.

Based on the network state information received from the transmitting device 100 and the management apparatus 400 according to the network state change and various network parameters of heterogeneous networks, including subscriber preference, subscriber type, charging system, and types of service applications to be provided, the policy management apparatus 600 may determine a network selection policy and provide the determined network selection policy to the transmitting device 100 and the management apparatus 400.

Therefore, for data transmission and reception between the transmitting device 100 and the external apparatus 500, the heterogeneous network based simultaneous data transmission service according to the present invention implements a simultaneous transmission service, which divides a piece of data, transmits or receives divided partial data between the transmitting device 100 and the management apparatus 400 through a plurality of heterogeneous networks, and reconstructs original data by combining received partial data with each other.

In order to use the simultaneous transmission service, the transmitting device 100 should access two or more networks (for example, a 3G network and a WiFi network) to be used for the simultaneous transmission service.

In the case of the WiFi network, it is typical that the transmitting device 100 accesses the WiFi network by transmitting or receiving packets to or from neighboring network interfaces (e.g. access points), estimates performances of the neighboring network interfaces (e.g. an access points) based on measurements of the packets, and accessing an optimum network interface (e.g. an access point) based on the estimation.

When the transmitting device 100 estimates the performance of the neighboring network interfaces (e.g. an access points) by itself, the estimation is performed after the transmitting device 100 accesses the WiFi network. Therefore, time and power are consumed for the transmitting device 100 turning on a WiFi modem and accessing the WiFi network.

Therefore, the policy management apparatus 600 according to the present invention has a configuration for determining the apparatus performance of at least one network interface accessible at the location of the transmitting device 100, generating priority access network interface information based on the determined apparatus performance of the at least one network interface, and providing a network selection policy including the generated priority access network interface information to the transmitting device 100 through an accessed network, so as to induce the transmitting device 100 to access a particular network interface.

Before the operation of the policy management apparatus 600 as described above, it is recommendable that the transmitting device 100 according to the present invention first accesses an authenticated first network, i.e. the 3G network, among the two or more networks to be used in the simultaneous transmission service.

In response to the transmitting device 100 accessing the 3G network, the policy management apparatus 600 determines apparatus performance of at least one network interface accessible at the location of the transmitting device 100.

That is, the policy management apparatus 600 recognizes at least one network interface which corresponds to the transmitting device 100 accessing the 3G network and is accessible at a location of the transmitting device 100.

For example, the policy management apparatus 600 may acquire transmitting device location information recognized based on an authenticated 3G network corresponding to the transmitting device 100 from a location management server 800. The location management server 800 refers to a server for providing location information of a transmitting device by using apparatus information, such as a GGSN or a base station apparatus of the 3G network, and longitude/latitude information. Of course, the policy management apparatus 600 may acquire the location information corresponding to the transmitting device 100 by using various other methods, for example, using a GPS.

Further, through interworking with a WiFi management server 700 for managing various information on WiFi APs, the policy management apparatus 600 may recognize at least one network interface (WiFi AP) located in an area corresponding to the location information of the transmitting device 100, that is, one or more network interfaces 300*a*, 300*b*, 300*c*, and 300*d* located at locations at which the transmitting device 100 can access the network interfaces.

Further, through interworking with the WiFi management server 700, the policy management apparatus 600 may determine the apparatus performance of the accessible one or more network interfaces 300*a*, 300*b*, 300*c*, and 300*d*.

That is, the policy management apparatus 600 may acquire one or more combinations of access history information and operation state information of the one or more network interfaces 300*a*, 300*b*, 300*c*, and 300*d* corresponding to the transmitting device 100 from the WiFi management server 700 and analyze the acquired one or more combinations of the access history information and the operation state information, so as to determine the apparatus performance of the one or more network interfaces 300*a*, 300*b*, 300*c*, and 300*d*.

As described above, the policy management apparatus 600 uses network information in determining the apparatus performance of the at least one network interface (WiFi AP) corresponding to a particular transmitting device 100.

Further, based on the determined apparatus performance of the one or more network interfaces 300a, 300b, 300c, and 300d, the policy management apparatus 600 generates priority access network interface information corresponding to the transmitting device 100.

For example, based on the determined apparatus performance of the one or more network interfaces 300a, 300b, 300c, and 300d, the policy management apparatus 600 may generate priority access network interface information, which include one or more combinations of a priority access list indicating network interfaces 300a and 300b to which the transmitting device 100 is induced to make a priority access and an access forbidden list indicating network interfaces 300c and 300d to which the transmitting device 100 is not allowed to try to make an access.

Further, the policy management apparatus 600 may provide the transmitting device 100 with a network selection policy including the generated priority access network interface information through an authenticated network, i.e. the 3G network.

Of course, the policy management apparatus 600 may provide the transmitting device 100 with the generated priority access network interface information through an authenticated network, i.e. the 3G network, separately from the network selection policy.

In this event, the policy management apparatus 600 provides the priority access network interface information to the transmitting device 100 by using a protocol between devices predefined as ANDSF devices.

After accessing the authenticated first network, i.e. the 3G network, first among the two or more networks to be used in the simultaneous transmission service as described above, the transmitting device 100 does not perform the conventional operation of estimating the performance of neighboring network interfaces (APs) by itself.

Further, the transmitting device 100 acquires a network selection policy including the priority access network interface information generated based on the apparatus performance of at least one accessible network interface.

That is, the transmitting device 100 receives the network selection policy from the policy management apparatus 600 through an already authenticated network, i.e. the 3G network.

Then, the transmitting device 100 makes a priority access to a particular network based on the priority access network interface information included in the network selection policy.

That is, the transmitting device 100 can identify the priority access list indicating network interfaces 300a and 300b to which the transmitting device 100 is induced to make a priority access and the access forbidden list indicating network interfaces 300c and 300d to which the transmitting device 100 is not allowed to try to make an access, from the priority access network interface information.

Then, the transmitting device 100 tries to make a priority access to one of the network interfaces 300a and 300b, which include the WiFi AP1 300a and the WiFi AP2 300b, according to the priority access list, and does not try to make an access to the network interfaces 300c and 300d according to the access forbidden list.

As a result, when the transmitting device 100 has successfully accessed one of the WiFi AP1 300a and the WiFi AP2 300b, the transmitting device 100 accesses the second network, i.e. the WiFi network, among the two or more networks to be used in the simultaneous transmission service through one of the accessed WiFi AP1 300a and WiFi AP2 300b.

By making a priority access to a particular network interface (AP) based on the priority access network interface information provided by the policy management apparatus 600 without performing the conventional operation for estimating an optimum network interface (AP) corresponding to the WiFi network by itself, the transmitting device 100 can access the WiFi network through an optimum network interface (AP).

Then, when the transmitting device 100 has accessed all of the two or more networks (for example, a 3G network and a WiFi network) to be used in the simultaneous transmission service, the transmitting device 100 can use the simultaneous transmission service.

That is, in order to use a simultaneous transmission service, the transmitting device 100 divides data to be transmitted and selects partial data divided from the data to be transmitted according to the priority access network interface information.

In other words, the transmitting device 100 identifies data transmission rates of the networks (for example, a 3G network and a WiFi network) included in the network selection policy, which include a first transmission rate for data transmission to the first network interface 200 and a second transmission rate for data transmission to the second network interface 300, and selects first partial data to be transmitted to the first network interface 200 and second partial data to be transmitted to the second network interface 300 from the divided partial data based on the identified transmission rates.

Further, the transmitting device 100 transmits the partial data selected for each network through the two or more networks including the authenticated network and the network accessed through the priority-accessed particular network.

In other words, the transmitting device 100 transmits multiple pieces of first partial data selected in accordance with the authenticated network, i.e. the 3G network, to the first network interface 200 located in the 3G network and transmits multiple pieces of second partial data selected in accordance with the network accessed through the priority-accessed particular network, i.e. the WiFi network, to the second network interface 300 located in the WiFi network. Then, the first network interface 200 transmits the first partial data to the management apparatus 400 and the second network interface 300 transmits the second partial data to the management apparatus 400.

As a result, the management apparatus 400 receives the first partial data transmitted by the transmitting device 100 from the first network interface 200 and receives the second partial data from the second network interface 300.

Then, the management apparatus 400 can reconstruct the original data to be transmitted by the transmitting device 100, by generating the data based on virtual network access information included in the received first partial data and second partial data. That is, the management apparatus 400 can reconstruct and generate the original data to be transmitted, by recognizing the first partial data and the second partial data having the same virtual network access information, indicating that they have been divided from one piece of data, based on the virtual network access information included in the multiple pieces of received partial data, and then combining the first partial data and the second partial data with each other according to the sequence information included in the first partial data and the second partial data.

Then, the management apparatus 400 transfers the reconstructed original data to be transmitted to the external apparatus 500.

Figure 8:
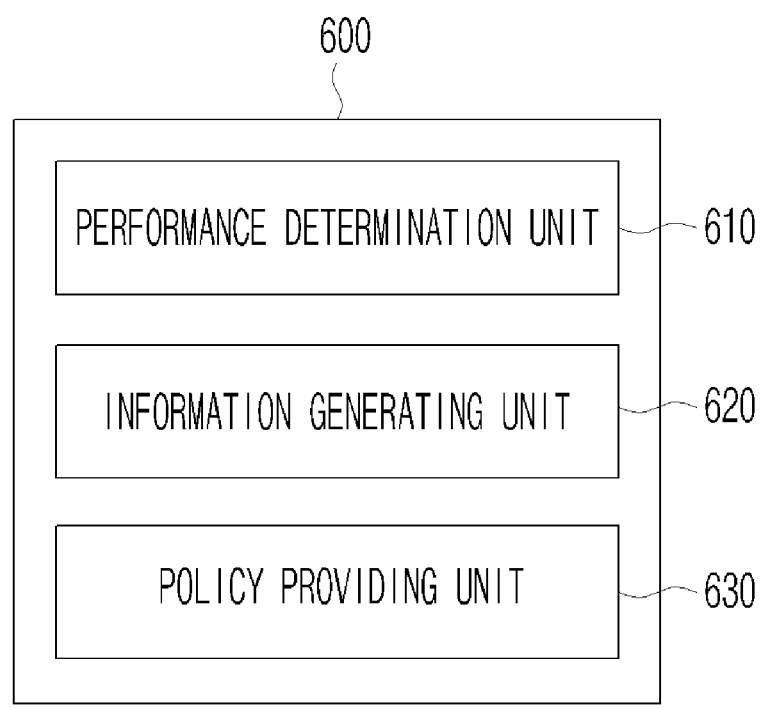
FIG. 8 is a block diagram illustrating a policy management apparatus according to an exemplary embodiment of the present invention.

Hereinafter, a construction of the policy management apparatus 600 according to an embodiment of the present invention will be described in more detail with reference to FIG. 8.

The policy management apparatus 600 includes: a performance determination unit 610a for determining apparatus performance of one or more network interfaces corresponding to a particular transmitting device 100 and accessible at a location of the transmitting device 100; an information generating unit 620a for generating priority access network interface information based on the determined apparatus performance of the one or more network interfaces; and a policy providing unit 630a for providing a network selection policy including the generated accessible network interface information to the transmitting device 100 through an accessed network, so as to induce the transmitting device 100 to access a particular network.

The performance determination unit 610a determines apparatus performance of one or more network interfaces which correspond to a particular transmitting device 100 and are accessible at a location of the transmitting device 100.

More specifically, the performance determination unit 610a may determine the apparatus performance of the one or more network interfaces by acquiring one or more combinations of access history information and operation state information of the one or more network interfaces corresponding to the transmitting device 100 and analyzing the acquired one or more combinations of the access history information and the operation state information.

For example, the performance determination unit 610a determines apparatus performance of one or more network interfaces which correspond to a particular transmitting device 100 and are accessible at a location of the transmitting device 100.

That is, the performance determination unit 610a may acquire transmitting device location information recognized based on an authenticated 3G network corresponding to the transmitting device 100 from a location management server 800. Of course, the performance determination unit 610a may acquire the location information corresponding to the transmitting device 100 by using various other methods, for example, using a GPS.

Further, through interworking with a WiFi management server 700 for managing various information on WiFi APs, the performance determination unit 610a may recognize one or more network interfaces (WiFi AP) located in an area corresponding to the location information of the transmitting device 100, that is, one or more network interfaces 300a, 300b, 300c, and 300d located at locations at which the transmitting device 100 can access the network interfaces.

Further, through interworking with the WiFi management server 700, the performance determination unit 610a may determine the apparatus performance of the accessible one or more network interfaces 300a, 300b, 300c, and 300d.

That is, the performance determination unit 610a may acquire one or more combinations of access history information and operation state information of the one or more network interfaces 300a, 300b, 300c, and 300d corresponding to the transmitting device 100 from the WiFi management server 700 and analyze the acquired one or more combinations of the access history information and the operation state information, so as to determine the apparatus performance of the one or more network interfaces 300a, 300b, 300c, and 300d.

The access history information may include a history (for example, number of times of accesses, number of times of access trials, authentication failure ratio of the access trials, etc.) of accesses to each of the one or more network interfaces 300a, 300b, 300c, and 300d by the transmitting device 100, and the operation state information may include information whether the one or more network interfaces 300a, 300b, 300c, and 300d are currently wrongly operating, the number of authenticated terminals which are currently accessing, and the quantity of processed traffics.

As described above, the performance determination unit 610a uses network information in determining the apparatus performance of the at least one network interface (WiFi AP) corresponding to a particular transmitting device 100.

Further, based on the apparatus performance of the one or more network interfaces 300a, 300b, 300c, and 300d determined by the performance determination unit 610a, the information generating unit 620a generates priority access network interface information corresponding to the transmitting device 100.

Specifically, based on the apparatus performance of the one or more network interfaces 300a, 300b, 300c, and 300d determined by the performance determination unit 610a, the information generating unit 620a may generate priority access network interface information, which include one or more combinations of a priority access list indicating network interfaces 300a and 300b to which the transmitting device 100 is induced to make a priority access and an access forbidden list indicating network interfaces 300c and 300d to which the transmitting device 100 is not allowed to try to make an access.

For example, based on the apparatus performance of the one or more network interfaces 300a, 300b, 300c, and 300d determined by the performance determination unit 610a, the information generating unit 620a may select n number of high-ranked network interfaces (for example, the WiFi AP1 300a and the WiFi AP2 300b) in a sequence in which a network interface having the best apparatus performance goes first and generate a priority access list indicating the selected network interfaces 300a and 300b to which the transmitting device 100 is induced to make a priority access. Also, based on the apparatus performance, the information generating unit 620a may select network interfaces (for example, network interfaces 300c and 300d) having apparatus performance lower than a performance threshold and generate an access forbidden list indicating the selected network interfaces 300c and 300d to which the transmitting device 100 is not allowed to try to make an access.

Therefore, the information generating unit 620a may generate priority access network interface information including the generated priority access list and access forbidden list.

The policy providing unit 630a provides a network selection policy including the priority access network interface information generated by the information generating unit 620a to the transmitting device 100 through an accessed network, so as to induce the transmitting device 100 to make a priority access to a particular network.

Specifically, the policy providing unit 630a may provide the transmitting device 100 with a network selection policy including the generated priority access network interface information through an authenticated network, i.e. the 3G network.

Of course, the policy providing unit 630*a* may provide the transmitting device 100 with the generated priority access network interface information through an authenticated network, i.e. the 3G network, separately from the network selection policy.

In this event, the policy providing unit 630*a* provides the priority access network interface information to the transmitting device 100 by using a protocol between devices predefined as ANDSF devices.

Figure 9:
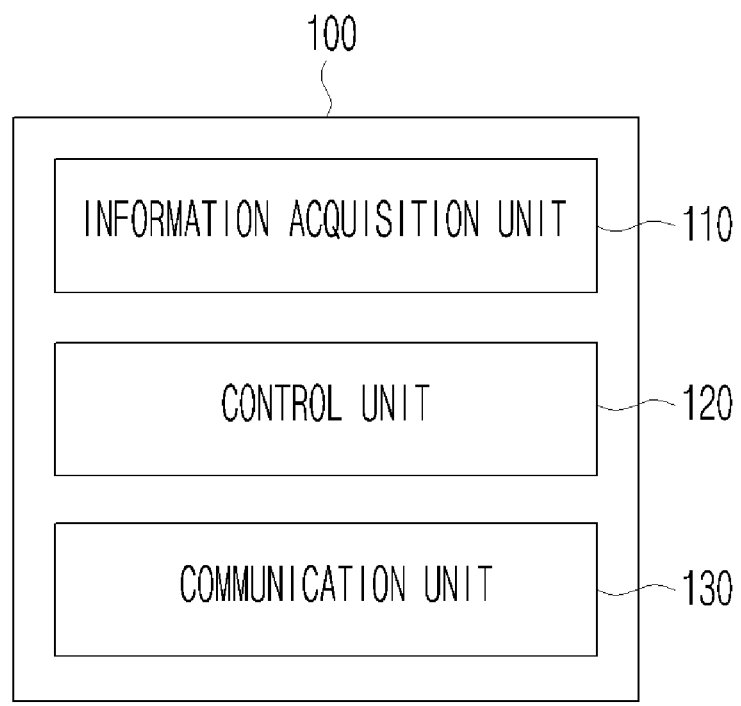
FIG. 9 is a block diagram illustrating a transmitting device according to an exemplary embodiment of the present invention.

Hereinafter, the transmitting device 100 according to an embodiment of the present invention will be described in more detail with reference to FIG. 9.

That is, the transmitting device 100 includes: an information acquisition unit 110 for acquiring a network selection policy including priority access network interface information generated based on apparatus performance of one or more accessible network interfaces; a control unit 120 for selecting partial data, which has been divided from data to be transmitted, based on the acquired network selection policy; and a communication unit 130 for first accessing a particular network interface based on the priority access network interface information included in the network selection policy and then transmitting the selected partial data.

Here, the communication unit 130 may refer to a communication module for interworking with the first network interface 200 through a 3G network and interworking with the second network interface 300 through a WiFi network.

When the transmitting device 100 wants to use a simultaneous transmission service, it is recommendable that the communication unit 130 first accesses an authenticated first network, i.e. the 3G network, among the two or more networks to be used in the simultaneous transmission service.

Also, the communication unit 130 does not perform the conventional operation of estimating the performance of neighboring second network interfaces (APs) by itself in order to access the particular or second network, i.e. the WiFi network, among the two or more networks.

Further, the information acquisition unit 110 acquires a network selection policy including the priority access network interface information generated based on the apparatus performance of at least one accessible network interface.

More specifically, the information acquisition unit 110 may receive the network selection policy including the priority access network interface information generated based on the apparatus performance of the one or more network interfaces determined by analyzing one or more combinations of access history information and operation state information of the one or more network interfaces corresponding to the transmitting device 100, from the policy management apparatus 600 through an authenticated network, i.e. the 3G network.

That is, the information acquisition unit 110 may receive the priority access network interface information including the priority access list and the access forbidden list as described above, from the policy management apparatus 600 through an authenticated network, i.e. the 3G network.

Alternatively, the information acquisition unit 110 may receive the network selection policy including the priority access network interface information from the policy management apparatus 600 through an authenticated network, i.e. the 3G network.

Then, when the information acquisition unit 110 has received the priority access network interface information, the communication unit 130 makes a priority access to a particular network based on the priority access network interface information.

Specifically, the communication unit 130 can identify the priority access list indicating network interfaces 300*a* and 300*b* to which the transmitting device 100 is induced to make a priority access and the access forbidden list indicating network interfaces 300*c* and 300*d* to which the transmitting device 100 is not allowed to try to make an access, from the priority access network interface information.

Then, the communication unit 130 tries to make a priority access to one of the network interfaces 300*a* and 300*b*, which include the WiFi AP1 300*a* and the WiFi AP2 300*b*, according to the priority access list, and does not try to make an access to the network interfaces 300*c* and 300*d* according to the access forbidden list.

As a result, when the communication unit 130 has successfully accessed one of the WiFi AP1 300*a* and the WiFi AP2 300*b*, the communication unit 130 accesses the second network, i.e. the WiFi network, among the two or more networks to be used in the simultaneous transmission service through one of the accessed WiFi AP1 300*a* and WiFi AP2 300*b*.

By making a priority access to a particular network interface (AP) based on the priority access network interface information provided by the policy management apparatus 600 without performing the conventional operation of estimating an optimum network interface (AP) corresponding to the WiFi network by itself, the transmitting device 100 can access the WiFi network through an optimum network interface (AP).

Then, when the transmitting device 100 has accessed all of the two or more networks (for example, a 3G network and a WiFi network) to be used in the simultaneous transmission service, the transmitting device 100 can use the simultaneous transmission service.

That is, the control unit 120 selects partial data divided from the data to be transmitted according to the priority access network interface information and provides the selected partial data to the communication unit 130.

For example, in order to use a simultaneous transmission service, the control unit 120 divides data to be transmitted and selects partial data divided from the data to be transmitted according to the priority access network interface information.

In other words, the control unit 120 identifies data transmission rates of the networks (for example, a 3G network and a WiFi network) included in the network selection policy, which include a first transmission rate for data transmission to the first network interface 200 and a second transmission rate for data transmission to the second network interface 300, and selects first partial data to be transmitted to the first network interface 200 and second partial data to be transmitted to the second network interface 300 from the divided partial data based on the identified transmission rates. Then, the control unit 120 provides the selected first partial data and second partial data to the communication unit 130.

Then, the communication unit 130 transmits the partial data selected for each network through the two or more networks including the authenticated network and the network accessed through the priority-accessed particular network.

As described above, in dividing data to be transmitted and simultaneously transmitting the divided data according to a network selection policy in a heterogeneous network environment by a heterogeneous network based simultaneous data transmission service system including a transmitting device and a policy management apparatus according to the present invention, the policy management apparatus provides the transmitting device with priority access network interface information, which includes priority access network interfaces and access forbidden network interfaces selected through apparatus performance analysis using network information among network interfaces accessible by the transmitting device, so that the transmitting device can access an optimum network interface based on the priority access network interface information received from the policy management apparatus even without estimating performances of neighboring apparatuses by itself.

Figure 10:
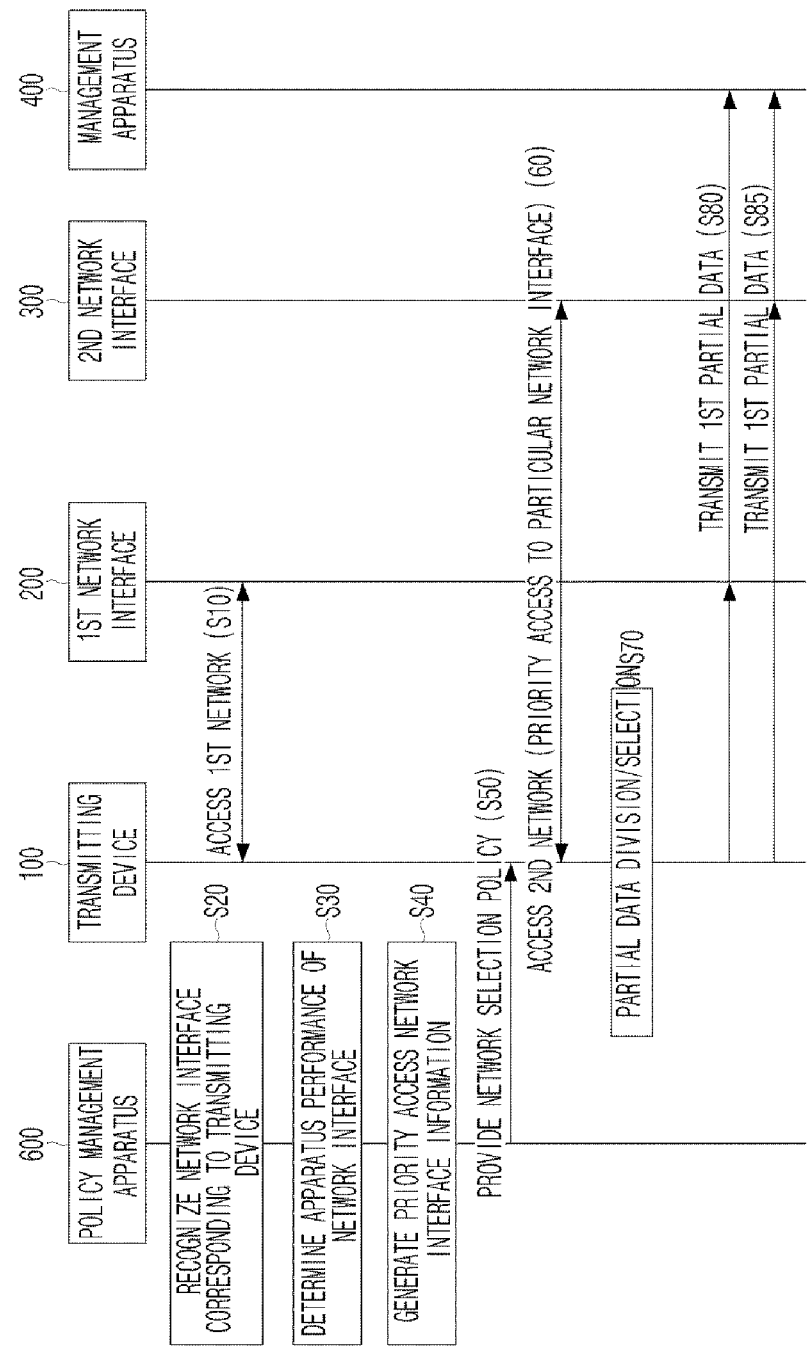
FIG. 10 is a signal flow diagram illustrating a heterogeneous network based simultaneous data transmission service method according to an exemplary embodiment of the present invention.
Figure 11:
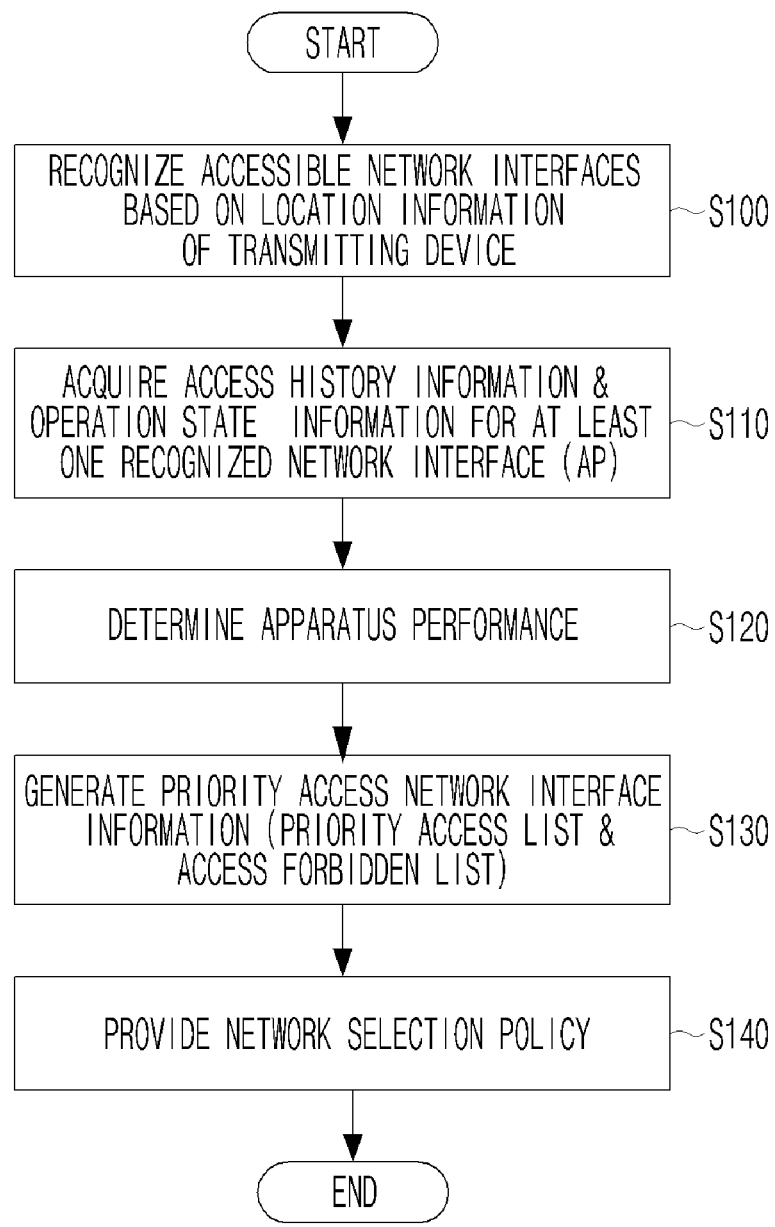
FIG. 11 is a flowchart illustrating an operation of a policy management apparatus according to an exemplary embodiment of the present invention.
Figure 12:
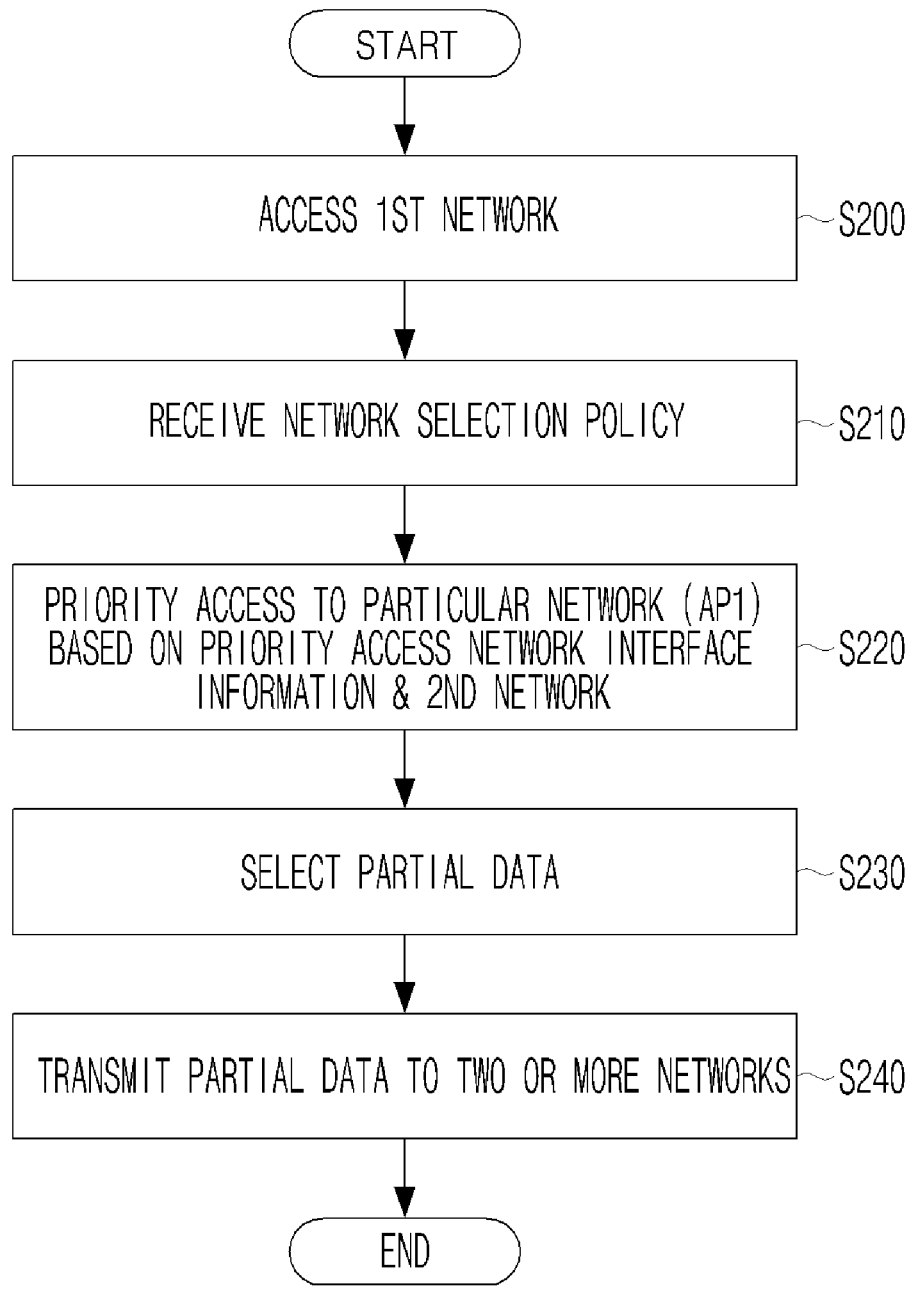
FIG. 12 is a flowchart illustrating an operation of a transmitting device according to an exemplary embodiment of the present invention.

Hereinafter, a heterogeneous network based simultaneous data transmission service method according to another embodiment of the present invention will be described with reference to FIGS. 10 to 12. In the following description, the same reference numerals will be used for the elements shown in FIGS. 7 to 9 for convenience of description.

Now, a heterogeneous network based simultaneous data transmission service method according to another embodiment of the present invention will be described with reference to FIG. 10.

First, in order to use the simultaneous transmission service, the transmitting device 100 should access two or more networks (for example, a 3G network and a WiFi network) to be used for the simultaneous transmission service.

Then, the transmitting device 100 according to the present invention first accesses an authenticated first network, i.e. the 3G network, among the two or more networks to be used in the simultaneous transmission service (step S10).

In response to the transmitting device 100 accessing the 3G network, the policy management apparatus 600 determines apparatus performance of at least one network interface accessible at the location of the transmitting device 100.

That is, the policy management apparatus 600 recognizes at least one network interface which corresponds to the transmitting device 100 accessing the 3G network and is accessible at a location of the transmitting device 100 (step S20).

For example, the policy management apparatus 600 may acquire transmitting device location information recognized based on an authenticated 3G network corresponding to the transmitting device 100 from a location management server 800. The location management server 800 refers to a server for providing location information of a transmitting device by using apparatus information, such as a GGSN or a base station apparatus of the 3G network, and longitude/latitude information. Of course, the policy management apparatus 600 may acquire the location information corresponding to the transmitting device 100 by using various other methods, for example, using a GPS.

Further, through interworking with a WiFi management server 700 for managing various information on WiFi APs, the policy management apparatus 600 may recognize at least one network interface (WiFi AP) located in an area corresponding to the location information of the transmitting device 100, that is, one or more network interfaces 300*a*, 300*b*, 300*c*, and 300*d* located at locations at which the transmitting device 100 can access the network interfaces.

Further, through interworking with the WiFi management server 700, the policy management apparatus 600 may determine the apparatus performance of the accessible one or more network interfaces 300*a*, 300*b*, 300*c*, and 300*d* (step S30).

That is, the policy management apparatus 600 may acquire one or more combinations of access history information and operation state information of the one or more network interfaces 300*a*, 300*b*, 300*c*, and 300*d* corresponding to the transmitting device 100 from the WiFi management server 700 and analyze the acquired one or more combinations of the access history information and the operation state information, so as to determine the apparatus performance of the one or more network interfaces 300*a*, 300*b*, 300*c*, and 300*d*.

As described above, the policy management apparatus 600 uses network information in determining the apparatus performance of the at least one network interface (WiFi AP) corresponding to a particular transmitting device 100.

Further, based on the determined apparatus performance of the one or more network interfaces 300*a*, 300*b*, 300*c*, and 300*d*, the policy management apparatus 600 generates priority access network interface information corresponding to the transmitting device 100 (step S40).

For example, based on the determined apparatus performance of the one or more network interfaces 300*a*, 300*b*, 300*c*, and 300*d*, the policy management apparatus 600 may generate priority access network interface information, which include one or more combinations of a priority access list indicating network interfaces 300*a* and 300*b* to which the transmitting device 100 is induced to make a priority access and an access forbidden list indicating network interfaces 300*c* and 300*d* to which the transmitting device 100 is not allowed to try to make an access.

Further, the policy management apparatus 600 may provide the transmitting device 100 with a network selection policy including the generated priority access network interface information through an authenticated network, i.e. the 3G network (step S50).

Of course, the policy management apparatus 600 may provide the transmitting device 100 with the generated priority access network interface information through an authenticated network, i.e. the 3G network, separately from the network selection policy.

In this event, the policy management apparatus 600 may provide the priority access network interface information to the transmitting device 100 by using a protocol between devices predefined as ANDSF devices.

After accessing the authenticated first network, i.e. the 3G network, first among the two or more networks to be used in the simultaneous transmission service as described above (step S10), the transmitting device 100 does not perform the conventional operation of estimating the performance of neighboring network interfaces (APs) by itself.

Further, the transmitting device 100 acquires a network selection policy including the priority access network interface information generated based on the apparatus performance of at least one accessible network interface.

That is, the transmitting device 100 receives the network selection policy from the policy management apparatus 600 through an already authenticated network, i.e. the 3G network (step S50).

Then, the transmitting device 100 makes a priority access to a particular network based on the priority access network interface information included in the network selection policy (step S60).

That is, the transmitting device 100 can identify the priority access list indicating network interfaces 300*a* and 300*b* to which the transmitting device 100 is induced to make a priority access and the access forbidden list indicating network interfaces 300*c* and 300*d* to which the transmitting device 100 is not allowed to try to make an access, from the priority access network interface information.

Then, the transmitting device 100 tries to make a priority access to one of the network interfaces 300*a* and 300*b*, which include the WiFi AP1 300*a* and the WiFi AP2 300*b*, according to the priority access list, and does not try to make an access to the network interfaces 300c and 300d according to the access forbidden list.

As a result, when the transmitting device 100 has successfully accessed one of the WiFi AP1 300a and the WiFi AP2 300b, the transmitting device 100 accesses the second network, i.e. the WiFi network, among the two or more networks to be used in the simultaneous transmission service through one of the accessed WiFi AP1 300a and WiFi AP2 300b.

By making a priority access to a particular network interface (AP) based on the priority access network interface information provided by the policy management apparatus 600 without performing the conventional operation for estimating an optimum network interface (AP) corresponding to the WiFi network by itself, the transmitting device 100 can access the WiFi network through an optimum network interface (AP).

Then, when the transmitting device 100 has accessed all of the two or more networks (for example, a 3G network and a WiFi network) to be used in the simultaneous transmission service, the transmitting device 100 can use the simultaneous transmission service.

That is, in order to use a simultaneous transmission service, the transmitting device 100 divides data to be transmitted and selects partial data divided from the data to be transmitted according to the priority access network interface information (step S70).

Further, the transmitting device 100 transmits the partial data selected for each network through the two or more networks including the authenticated network and the network accessed through the priority-accessed particular network.

In other words, the transmitting device 100 transmits multiple pieces of first partial data selected in accordance with the authenticated network, i.e. the 3G network, to the first network interface 200 located in the 3G network (step S80) and transmits multiple pieces of second partial data selected in accordance with the network accessed through the priority-accessed particular network, i.e. the WiFi network, to the second network interface 300 located in the WiFi network (step S85). Then, the first network interface 200 transmits the first partial data to the management apparatus 400 and the second network interface 300 transmits the second partial data to the management apparatus 400.

As a result, the management apparatus 400 receives the first partial data transmitted by the transmitting device 100 from the first network interface 200 and receives the second partial data from the second network interface 300. Then, the management apparatus 400 can reconstruct the original data to be transmitted, by combining the first partial data and the second partial data with each other according to the sequence information included in the first partial data and the second partial data.

Then, the management apparatus 400 transfers the reconstructed original data to be transmitted to the external apparatus 500.

Hereinafter, an operation method of a policy management apparatus according to an embodiment of the present invention will be described in more detail with reference to FIG. 11.

In the operation method of a policy management apparatus according to an embodiment of the present invention, the policy management apparatus determines apparatus performance of one or more network interfaces which correspond to a particular transmitting device 100 and are accessible at a location of the transmitting device 100 (steps S100 to S120).

More specifically, in the operation method of a policy management apparatus according to an embodiment of the present invention, the policy management apparatus may determine the apparatus performance of the one or more network interfaces by acquiring one or more combinations of access history information and operation state information of the one or more network interfaces corresponding to the transmitting device 100 and analyzing the acquired one or more combinations of the access history information and the operation state information.

For example, in the operation method of a policy management apparatus according to an embodiment of the present invention, the policy management apparatus determines apparatus performance of one or more network interfaces which correspond to a particular transmitting device 100 and are accessible at a location of the transmitting device 100 (step S100).

That is, in the operation method of a policy management apparatus according to an embodiment of the present invention, the policy management apparatus may acquire transmitting device location information recognized based on an authenticated 3G network corresponding to the transmitting device 100 from a location management server 800. Of course, in the operation method of a policy management apparatus according to an embodiment of the present invention, the policy management apparatus may acquire the location information corresponding to the transmitting device 100 by using various other methods, for example, using a GPS.

Further, in the operation method of a policy management apparatus according to an embodiment of the present invention, through interworking with a WiFi management server 700 for managing various information on WiFi APs, the policy management apparatus may recognize one or more network interfaces (WiFi AP) located in an area corresponding to the location information of the transmitting device 100, that is, one or more network interfaces 300a, 300b, 300c, and 300d located at locations at which the transmitting device 100 can access the network interfaces.

Further, in the operation method of a policy management apparatus according to an embodiment of the present invention, through interworking with the WiFi management server 700, the policy management apparatus may determine the apparatus performance of the accessible one or more network interfaces 300a, 300b, 300c, and 300d.

That is, in the operation method of a policy management apparatus according to an embodiment of the present invention, the policy management apparatus may acquire one or more combinations of access history information and operation state information of the one or more network interfaces 300a, 300b, 300c, and 300d corresponding to the transmitting device 100 from the WiFi management server 700 (step S110) and analyze the acquired one or more combinations of the access history information and the operation state information, so as to determine the apparatus performance of the one or more network interfaces 300a, 300b, 300c, and 300d (step S120).

The access history information may include a history (for example, number of times of accesses, number of times of access trials, authentication failure ratio of the access trials, etc.) of accesses to each of the one or more network interfaces 300a, 300b, 300c, and 300d by the transmitting device 100, and the operation state information may include information whether the one or more network interfaces 300a, 300b, 300c, and 300d are currently wrongly operating, the number of authenticated terminals which are currently accessing, and the quantity of processed traffics.

As described above, in the operation method of a policy management apparatus according to an embodiment of the present invention, the policy management apparatus uses network information in determining the apparatus performance of the at least one network interface (WiFi AP) corresponding to a particular transmitting device 100.

Further, in the operation method of a policy management apparatus according to an embodiment of the present invention, based on the apparatus performance of the one or more network interfaces 300a, 300b, 300c, and 300d determined by the performance determination unit 610a, the policy management apparatus generates priority access network interface information corresponding to the transmitting device 100 (step S130).

Specifically, in the operation method of a policy management apparatus according to an embodiment of the present invention, based on the apparatus performance of the one or more network interfaces 300a, 300b, 300c, and 300d determined by the performance determination unit 610a, the policy management apparatus may generate priority access network interface information, which include one or more combinations of a priority access list indicating network interfaces 300a and 300b to which the transmitting device 100 is induced to make a priority access and an access forbidden list indicating network interfaces 300c and 300d to which the transmitting device 100 is not allowed to try to make an access.

For example, in the operation method of a policy management apparatus according to an embodiment of the present invention, based on the apparatus performance of the one or more network interfaces 300a, 300b, 300c, and 300d determined by the performance determination unit 610a, the policy management apparatus may select n number of high-ranked network interfaces (for example, the WiFi AP1 300a and the WiFi AP2 300b) in a sequence in which a network interface having the best apparatus performance goes first and generate a priority access list indicating the selected network interfaces 300a and 300b to which the transmitting device 100 is induced to make a priority access. Also, based on the apparatus performance, the policy management apparatus 600 may select network interfaces (for example, network interfaces 300c and 300d) having apparatus performance lower than a performance threshold and generate an access forbidden list indicating the selected network interfaces 300c and 300d to which the transmitting device 100 is not allowed to try to make an access.

Therefore, in the operation method of a policy management apparatus according to an embodiment of the present invention, the policy management apparatus may generate priority access network interface information including the generated priority access list and access forbidden list.

In the operation method of a policy management apparatus according to an embodiment of the present invention, the policy management apparatus provides a network selection policy including the generated priority access network interface information to the transmitting device 100 through an accessed network (step S140), so as to induce the transmitting device 100 to make a priority access to a particular network.

Specifically, in the operation method of a policy management apparatus according to an embodiment of the present invention, the policy management apparatus may provide the transmitting device 100 with a network selection policy including the generated priority access network interface information through an authenticated network, i.e. the 3G network.

Of course, in the operation method of a policy management apparatus according to an embodiment of the present invention, the policy management apparatus may provide the transmitting device 100 with the generated priority access network interface information through an authenticated network, i.e. the 3G network, separately from the network selection policy.

In this event, in the operation method of a policy management apparatus according to an embodiment of the present invention, the policy management apparatus provides the priority access network interface information to the transmitting device 100 by using a protocol between devices predefined as ANDSF devices.

Hereinafter, an operation method of a transmitting device according to the present invention will be described in more detail with reference to FIG. 12.

In the operation method of a transmitting device according to the present invention, the transmitting device first accesses an authenticated first network, i.e. the 3G network, among the two or more networks to be used in the simultaneous transmission service (step S200).

Also, in the operation method of a transmitting device according to the present invention, the transmitting device does not perform the conventional operation of estimating the performance of neighboring second network interfaces (APs) by itself in order to access the particular or second network, i.e. the WiFi network, among the two or more networks.

Further, in the operation method of a transmitting device according to the present invention, the transmitting device acquires a network selection policy including the priority access network interface information generated based on the apparatus performance of at least one accessible network interface (step S210).

More specifically, in the operation method of a transmitting device according to the present invention, the transmitting device may receive the network selection policy including the priority access network interface information generated based on the apparatus performance of the one or more network interfaces determined by analyzing one or more combinations of access history information and operation state information of the one or more network interfaces corresponding to the transmitting device 100, from the policy management apparatus 600 through an authenticated network, i.e. the 3G network.

That is, in the operation method of a transmitting device according to the present invention, the transmitting device may receive the priority access network interface information including the priority access list and the access forbidden list as described above, from the policy management apparatus 600 through an authenticated network, i.e. the 3G network.

Alternatively, in the operation method of a transmitting device according to the present invention, the transmitting device may receive the network selection policy including the priority access network interface information from the policy management apparatus 600 through an authenticated network, i.e. the 3G network.

Then, in the operation method of a transmitting device according to the present invention, when the transmitting device has received the priority access network interface information, the transmitting device makes a priority access to a particular network based on the priority access network interface information (step S220).

Specifically, in the operation method of a transmitting device according to the present invention, the transmitting device may identify the priority access list indicating network interfaces 300a and 300b to which the transmitting device 100 is induced to make a priority access and the access forbidden list indicating network interfaces 300c and 300d to which the transmitting device 100 is not allowed to try to make an access, from the priority access network interface information.

Then, in the operation method of a transmitting device according to the present invention, the transmitting device tries to make a priority access to one of the network interfaces 300a and 300b, which include the WiFi AP1 300a and the WiFi AP2 300b, according to the priority access list, and does not try to make an access to the network interfaces 300c and 300d according to the access forbidden list.

As a result, in the operation method of a transmitting device according to the present invention, when the communication unit 130 has successfully accessed one of the WiFi AP1 300a and the WiFi AP2 300b, the transmitting device accesses the second network, i.e. the WiFi network, among the two or more networks to be used in the simultaneous transmission service through one of the accessed WiFi AP1 300a and WiFi AP2 300b.

In the operation method of a transmitting device according to the present invention, by making a priority access to a particular network interface (AP) based on the priority access network interface information provided by the policy management apparatus 600 without performing the conventional operation of estimating an optimum network interface (AP) corresponding to the WiFi network by itself, the transmitting device can access the WiFi network through an optimum network interface (AP).

Then, in the operation method of a transmitting device according to the present invention, when the transmitting device has accessed all of the two or more networks (for example, a 3G network and a WiFi network) to be used in the simultaneous transmission service, the transmitting device can use the simultaneous transmission service (steps S230 and S240).

That is, in the operation method of a transmitting device according to the present invention, in order to use a simultaneous transmission service, the transmitting device divides data to be transmitted and selects partial data divided from the data to be transmitted according to the priority access network interface information.

In other words, in the operation method of a transmitting device according to the present invention, the transmitting device identifies data transmission rates of the networks (for example, a 3G network and a WiFi network) included in the network selection policy, which include a first transmission rate for data transmission to the first network interface 200 and a second transmission rate for data transmission to the second network interface 300, and selects first partial data to be transmitted to the first network interface 200 and second partial data to be transmitted to the second network interface 300 from the divided partial data based on the identified transmission rates.

Then, in the operation method of a transmitting device according to the present invention, the transmitting device transmits the partial data selected for each network through the two or more networks including the authenticated network and the network accessed through the priority-accessed particular network (step S240).

As described above, in dividing data to be transmitted and simultaneously transmitting the divided data according to a network selection policy in a heterogeneous network environment by a heterogeneous network based simultaneous data transmission service method according to the present invention, a policy management apparatus provides the transmitting device with priority access network interface information, which includes priority access network interfaces and access forbidden network interfaces selected through apparatus performance analysis using network information among network interfaces accessible by the transmitting device, so that a transmitting device can access an optimum network interface based on the priority access network interface information received from the policy management apparatus even without estimating performances of neighboring apparatuses by itself.

Meanwhile, the steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of storage medium (e.g. a computer-readable storage medium) known in the art. A sample storage medium may be coupled to a machine such as, for example, a computer/processor (which may be referred to herein, for convenience, as a "processor") such that the processor can read information (e.g., software commands) from and write information to the storage medium. A sample storage medium may be integral to the processor. The processor and the storage medium may reside in an ASIC. The ASIC may reside in user equipment. In the alternative, the processor and the storage medium may reside as discrete components in user equipment.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

INDUSTRIAL APPLICABILITY

As described above, in accordance with an aspect of the present invention, a network selection policy including information of a network interface selected from a plurality of network interfaces identified by the transmitting device is provided so as for the transmitting device to access the selected network interface for simultaneous data transmission service in multi-networks environments, so that control of the access of the transmitting device to the optimum network interface can be more effective and high reliability and enhancement of data transmission speed can be achieved in simultaneous data transmission service. Therefore, the present invention has overcome and exceeded the limit of the conventional technology and thus has a sufficient marketability or possibility of sale of not only the pertinent technology but also applied products. Moreover, the present invention has been disclosed clearly enough to carry out the present invention by one skilled in the art. Therefore, the present invention has an industrial applicability.

What is claimed is:

1. A transmission apparatus for simultaneously transmitting data through two or more multi-network interfaces in heterogeneous network, comprising:
 a processor, said processor comprising:

an information acquisition unit that
    collects network information per a pre-established cycle for acquiring a network selection policy from a policy management apparatus, the network selection policy including information on at least one accessible network interface among the multi-network interfaces, and
    transmits a policy request including the collected network information to the policy management apparatus through a first network interface, wherein the policy request is transmitted to acquire the network selection policy with respect to a current location of the transmission apparatus;
a control unit that
    divides data, which is transmitted to a management apparatus through the first network interface, into two or more partial data such that said two or more partial data are simultaneously transmitted through the first network interface and at least one second network interface, based on the network selection policy transferred from the policy management apparatus, and
    selects from among said two or more partial data first partial data to be transmitted through the first network interface and from among said two or more partial data second partial data to be transmitted through the second network interface, where the second network interface is determined to be the accessible network interface selected from among the multi-network interfaces according to the network selection policy; and
a communication unit that
    selects the second network interface from said at least one accessible network interface among the multi-network interfaces based on the network selection policy, and
    simultaneously transmits the first partial data through the first network interface, and the second partial data through the second network interface which is selected based on the network selection policy.

2. The transmission apparatus as claimed in claim 1,
wherein the information on the at least one accessible network interface corresponds to priority access network interface information obtained based on performance of the at least one accessible network interface,
wherein the priority access network interface information includes
    an access forbidden list indicating one or more unregistered network interfaces to which the transmission apparatus is not allowed to try to make an access,
wherein the unregistered network interfaces comprise network interfaces optionally installed in a WiFi network, and
wherein the performance is estimated based on measurements of packets received via the least accessible network interface among the at least one accessible network interface.

3. A policy management apparatus for simultaneously transmitting data through two or more multi-network interfaces in heterogeneous network, comprising:
a processor, said processor comprising:
    an information generating unit that generates information on at least one accessible network interface among multi-network interfaces with respect to a current location of a transmitting device, based on collected network information included in a policy request transmitted by the transmitting device; and
    a policy providing unit that provides a network selection policy including the information on the at least one accessible network interface to the transmitting device,
wherein the transmitting device
    divides data, which is transmitted to a management apparatus through a first network interface, into two or more partial data such that said two or more partial data are simultaneously transmitted through the first network interface and at least one second network interface, based on the network selection policy transferred from the policy management apparatus,
    selects from among said two or more partial data first partial data to be transmitted through the first network interface and from among said two or more partial data second partial data to be transmitted through the second network interface, where the second network interface is determined to be the accessible network interface selected from among the multi-network interfaces, and
    selects the second network interface from said at least one accessible network interface among the multi-network interfaces based on the network selection policy,
wherein the information on the at least one accessible network interface corresponds to priority access network interface information obtained based on performance of the at least one accessible network interface, and
wherein the priority access network interface information includes
    an access forbidden list indicating one or more unregistered network interfaces to which the transmitting device is not allowed to try to make an access, and
wherein the unregistered network interfaces comprise network interfaces optionally installed in a WiFi network.

4. The policy management apparatus as claimed in claim 3, wherein the at least one accessible network interface includes pre-registered location-specific network interfaces among the multi-network interfaces accessible to the transmitting device without authentication.

5. The policy management apparatus as claimed in claim 3, wherein the performance is estimated based on measurements of packets received at the transmitting device via the least one accessible network interface.

6. The policy management apparatus as claimed in claim 3, wherein the policy providing unit provides the transmitting device with a network selection policy for interrupting an access to a particular network interface among the at least one accessible network interface, when there is no data traffic between the transmitting device and the particular network interface.

7. An operation method of a policy management apparatus for simultaneously transmitting data through two or more multi-network interfaces in heterogeneous network, the method performed by a processor and comprising:
    identifying at least one accessible network interface among multi-network interfaces, with respect to a current location of a transmitting device, based on collected network information included in a policy request transmitted by the transmitting device;
    generating information on the at least one accessible network interface; and providing a network selection policy including the information on the at least one accessible network interface to the transmitting device,
wherein the transmitting device
divides data, which is transmitted to a management apparatus through a first network interface, into two or more partial data such that said two or more partial data are simultaneously transmitted through the first network interface and at least one second network interface, based on the network selection policy transferred from the policy management apparatus,
selects from among said two or more partial data first partial data to be transmitted through the first network interface and from among said two or more partial data second partial data to be transmitted through the second network interface, where the second network interface is determined to be the accessible network interface selected from among the multi-network interfaces, and
selects the second network interface from said at least one accessible network interface among the multi-network interfaces based on the network selection policy,
wherein the information on the at least one accessible network interface corresponds to priority access network interface information obtained based on performance of the at least one accessible network interface, and
wherein the priority access network interface information includes
an access forbidden list indicating one or more unregistered network interfaces to which the transmitting device is not allowed to try to make an access, and
wherein the unregistered network interfaces comprise network interfaces optionally installed in a WiFi network.

8. The operation method as claimed in claim 7, wherein the performance is estimated based on measurements of packets received at the transmitting device via the least one accessible network interface.

9. A transmission apparatus for simultaneously transmitting data through two or more multi-network interfaces in heterogeneous network, comprising:
a processor, said processor comprising:
an information acquisition unit that
collects network information per a pre-established cycle for acquiring a network selection policy from a policy management apparatus, the network selection policy including information on at least one priority access network interface among one or more accessible network interfaces, based on performance of the one or more accessible network interfaces, wherein the performance is estimated based on measurements of packets received via the one or more accessible network interfaces;
a control unit that
divides data, which is transmitted to a management apparatus through a first network interface, into two or more partial data such that said two or more partial data are simultaneously transmitted through the first network interface and at least one second network interface, based on the network selection policy transferred from the policy management apparatus, and
selects from among said two or more partial data first partial data to be transmitted through the first network interface, and from among said two or more partial data second partial data to be transmitted through the second network interface, where the second network interface is determined to be the priority access network interface selected from the one or more accessible network interfaces; and
a communication unit that
selects the second network interface from said at least one accessible network interface among the multi-network interfaces based on the network selection policy, and
simultaneously transmits the first partial data through the first network interface, and the second partial data through the second network interface which is selected based on the network selection policy,
wherein the information on at least one priority access network interface includes
an access forbidden list indicating one or more unregistered network interfaces to which the transmitting device is not allowed to try to make an access, and
wherein the unregistered network interfaces comprise network interfaces optionally installed in a WiFi network.

10. A policy management apparatus for simultaneously transmitting data through two or more multi-network interfaces in heterogeneous network, comprising:
a processor, said processor comprising:
a performance determination unit that determines performance of at least one accessible network interface accessible of the multi-network interfaces with respect to a transmitting device, wherein the performance is estimated based on measurements of packets received at the transmitting device via the least one accessible network interface;
an information generating unit that generates information on at least one priority access network interface among the at least one accessible network interface based on the performance of the at least one accessible network interface, when collected network information included in a policy request is received from the transmitting device; and
a policy providing unit that provides a network selection policy including the information on the at least one priority access network interface to the transmitting device,
wherein the transmitting device
divides data, which is transmitted to a management apparatus through a first network interface, into two or more partial data such that said two or more partial data are simultaneously transmitted through the first network interface and at least one second network interface, based on the network selection policy transferred from the policy management apparatus,
selects from among said two or more partial data first partial data to be transmitted through the first network interface, and from among said two or more partial data second partial data to be transmitted through the second network interface, where the second network interface is determined to be the priority access network interface selected from among the at least one accessible network interface according to the network selection policy including the information generated based on the performance, and selects the second network interface from said at least one priority access network interface among the multi-network interfaces based on the network selection policy.

11. The policy management apparatus as claimed in claim 10,
wherein the information on at least one priority access network interface includes
an access forbidden list indicating one or more unregistered network interfaces to which the transmitting device is not allowed to try to make an access,
wherein the unregistered network interfaces comprise network interfaces optionally installed in a WiFi network, and
wherein the performance determination unit acquires at least one of access history information or operation state information of the transmitting device with respect to each of the at least one accessible network interface, and determines the performance further using at least one of the access history information or the operation state information.

12. The policy management apparatus as claimed in claim 11, wherein
the access history information comprises at least one of
the number of access trials, or
the number of an access failure or an access success, and
the operation state information comprises at least one of
information on whether the at least one accessible network interface is malfunctioning,
the number of accessed devices, or
a quantity of processed traffics.

13. The policy management apparatus as claimed in claim 10, wherein the information on the at least one priority access network interface comprises at least one of
a priority access list of network interfaces to which the transmitting device is to make a priority access, and
an access forbidden list of network interfaces to which the transmitting device is not allowed to try to make an access.

14. An operation method of a transmitting device for simultaneously transmitting data through two or more multi-network interfaces in heterogeneous network, the method performed by a processor and comprising:
collecting network information per a pre-established cycle for acquiring a network selection policy from a policy management apparatus, the network selection policy including information on at least one accessible network interface among the multi-network interfaces,
transmitting a policy request including the collected network information to the policy management apparatus through a first network interface, wherein the policy request is transmitted to acquire the network selection policy;
dividing data, which is transmitted to a management apparatus through the first network interface, into two or more partial data such that said two or more partial data are simultaneously transmitted through the first network interface and at least one second network interface, based on the network selection policy;
selecting from among said two or more partial data first partial data to be transmitted through the first network interface, and from among said two or more partial data second partial data to be transmitted through the second network interface, where the second network interface is determined to be the accessible network interface selected from the one or more accessible network interfaces; and
simultaneously transmits the first partial data through the first network interface, and the second partial data through the second network interface which is selected based on the network selection policy.

15. An operation method of a policy management apparatus for simultaneously transmitting data through two or more multi-network interfaces in heterogeneous network, the method performed by a processor and comprising:
determining performance of at least one accessible network interface accessible of the multi-network interfaces with respect to a transmitting device, wherein the performance is estimated based on measurements of packets received at the transmitting device via the least one accessible network interface;
generating information on at least one priority access network interface among the one or more accessible network interfaces based on the performance of the at least one accessible network interface, when collected network information included in a policy request is received from the transmitting device; and
providing a network selection policy including the information on the at least one priority access network interface to the transmitting device,
wherein the transmitting device
divides data, which is transmitted to a management apparatus through a first network interface, into two or more partial data such that said two or more partial data are simultaneously transmitted through the first network interface and at least one second network interface, based on the network selection policy transferred from the policy management apparatus,
selects from among said two or more partial data first partial data to be transmitted through the first network interface, and from among said two or more partial data second partial data to be transmitted through the second network interface, where the second network interface is determined to be the priority access network interface selected from among the at least one accessible network interface according to the network selection policy including the information generated based on the performance, and
selects the second network interface from said at least one priority access network interface among the multi-network interfaces based on the network selection policy.

16. The transmission apparatus as claimed in claim 1, wherein the unregistered network interfaces comprise network interfaces which acquire only user information of an accessed terminal device.

17. The transmission apparatus as claimed in claim 1, wherein the unregistered network interfaces comprise network interfaces which do not have a traffic corresponding to the transmission apparatus.

18. The transmission apparatus as claimed in claim 1, wherein the priority access network interface information includes a priority access list indicating one or more network interfaces to which the transmitting device is induced to make a priority access.

19. The operation method as claimed in claim 15, wherein the information on at least one priority access network interface includes an access forbidden list indicating one or more unregistered network interfaces to which the transmitting device is not allowed to try to make an access, and
wherein the unregistered network interfaces comprise network interfaces optionally installed in a WiFi network.

* * * * *